United States Patent
Shen et al.

(10) Patent No.: US 12,206,528 B2
(45) Date of Patent: Jan. 21, 2025

(54) COMMUNICATION SYSTEM, LINK TRAINING METHOD, AND RELATED DEVICE

(71) Applicant: Huawei Technologies Co., Ltd., Shenzhen (CN)

(72) Inventors: Dongdong Shen, Shanghai (CN); Zhaohua Qian, Shanghai (CN); Jingjing Wang, Shenzhen (CN); Guang Qian, Shenzhen (CN); Xiaowei Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1 day.

(21) Appl. No.: 18/333,760

(22) Filed: Jun. 13, 2023

(65) Prior Publication Data
US 2023/0344683 A1    Oct. 26, 2023

Related U.S. Application Data

(63) Continuation of application No. PCT/CN2020/136252, filed on Dec. 14, 2020.

(51) Int. Cl.
H04B 10/40 (2013.01)
H04L 25/03 (2006.01)

(52) U.S. Cl.
CPC .............. *H04L 25/03012* (2013.01)

(58) Field of Classification Search
CPC .... H04B 10/40; H04B 7/0695; H04B 7/0617; H04B 3/32; H04B 5/72; H04B 1/40; H04B 7/088; H04B 5/48; H04B 10/27; H04W 40/38; H04W 24/04; H04W 24/08; H04W 88/085; H04W 88/12; H04W 4/06; H04W 4/20; H04W 4/80; H04W 40/20; H04L 45/02; H04L 45/22; H04L 45/50; H04L 43/50; H04L 43/0811; H04L 61/4511; H04L 45/04; H04L 45/745; H04L 12/437
USPC ........................................................ 375/231
See application file for complete search history.

(56) References Cited

U.S. PATENT DOCUMENTS

| | | | |
|---|---|---|---|
| 2007/0192505 A1* | 8/2007 | Dalmia | H04L 5/1446 709/233 |
| 2008/0273602 A1* | 11/2008 | Glen | H04L 25/0272 375/257 |
| 2008/0318465 A1* | 12/2008 | Johnsen | G06F 11/30 439/488 |
| 2013/0339552 A1 | 12/2013 | Wang | |

(Continued)

OTHER PUBLICATIONS

Bandlamudi, S., et al., "Method to Improve Link Bring-Up Time for High-Speed Ethernet Backplane and Copper Cables," Technical Disclosure Commons, Defensive Publications Series, URL: https://www.tdcommons.org/dpubs_series, Feb. 26, 2020, 7 pages.

*Primary Examiner* — Eva Y Puente
(74) *Attorney, Agent, or Firm* — Conley Rose, P.C.

(57) ABSTRACT

A communication system includes a first device, a second device, and a cable that connects the first device and the second device, and the cable stores cable information of the cable. A link training method includes: obtaining device information of the first device, obtaining the cable information from the cable, and obtaining device information of the second device; and performing link training between the first device and the second device based on the device information of the first device, the cable information, and the device information of the second device.

20 Claims, 7 Drawing Sheets

(56) References Cited

U.S. PATENT DOCUMENTS

2017/0207952 A1* 7/2017 Ogawa .................... H04L 41/14
2019/0042507 A1* 2/2019 Venkatesan ............. H04L 25/08
2021/0119835 A1* 4/2021 Levin ................ H04L 25/03146

* cited by examiner

COMMUNICATION SYSTEM, LINK TRAINING METHOD, AND RELATED DEVICE

CROSS-REFERENCE TO RELATED APPLICATIONS

This application is a continuation of International Patent Application No. PCT/CN2020/136252 filed on Dec. 14, 2020, the disclosure of which is hereby incorporated by reference in its entirety.

TECHNICAL FIELD

The present disclosure relates to the field of communication technologies, and in particular, to a communication system, a link training method, and a related device.

BACKGROUND

As a link rate increases, mutual matching between equalization at a transmit end and equalization at a receive end that are of a chip becomes increasingly more important. Therefore, link training (LT) between the transmit end and the receive end becomes increasingly more important. However, complex link training makes convergence time of the link training become a great challenge. Especially, under a link limit, for example, when a working environment of a system is extremely limited due to a factor such as a long cable or poor cable quality, a maximum working rate (or a maximum rate) of the system cannot be determined by using an existing link training method, and a rate may be traversed. Traversing the rate results in two serious problems. First, the transmit end and the receive end need to interact with each other by using a low-speed signal, which greatly increases waiting time. Second, traversing the rate multiplies equalization combinations and convergence cannot be completed in short time.

In addition, in an existing fast link training method, training data is stored by using a non-volatile memory (NVM), to improve a training speed. However, this method has obvious limitations. First, a link component is not replaceable and is only applicable to a fixed system. If product forms of an upstream device, a lane, and a downstream device change greatly, the system needs to be initialized again, and the fast training method is completely invalid. Second, an equalization parameter cannot be predicted. Link training needs to be completed and related data needs to be saved before delivery of a device. As a result, a user cannot perform free networking. Third, there is no equalization fine adjustment function, resulting in low precision.

Based on the foregoing descriptions, with openness of a consumer product ecosystem, devices and lane components of a plurality of vendors vary greatly. Therefore, it is urgent to develop a fast link training method suitable for complex product forms.

SUMMARY

Embodiments of the present disclosure disclose a communication system, a link training method, and a related device, so that fast link training can still be implemented after a link component is replaced.

According to a first aspect, an embodiment of the present disclosure provides a communication system, including a first device, a second device, and a cable that connects the first device and the second device, where the cable stores cable information of the cable, and the cable information represents a cable capability; the first device and/or the second device are/is configured to obtain device information of the first device, obtain the cable information from the cable, and obtain device information of the second device, where the device information represents a device capability; and the first device and/or the second device are/is further configured to perform link training between the first device and the second device based on the device information of the first device, the cable information, and the device information of the second device.

In this embodiment of the present disclosure, the first device stores the device information of the first device, the second device stores the device information of the second device, and the device information represents the device capability; the first device and the second device are connected through the cable, the cable stores the cable information of the cable, and the cable information represents the cable capability; during link training, the first device obtains the device information of the first device that is stored in the first device, obtains the cable information from the cable, and obtains the device information of the second device from the second device; the second device obtains the device information of the second device that is stored in the second device, obtains the cable information from the cable, and obtains the device information of the first device from the first device; and after obtaining the device information of the first device, the cable information, and the device information of the second device, both the first device and the second device may perform link training between the first device and the second device based on the device information of the first device, the cable information, and the device information of the second device. For example, both the first device and the second device may determine, based on the device information of the first device, the cable information, and the device information of the second device, a maximum working rate supported by the communication system, and perform fast link training between the first device and the second device at the maximum working rate. It can be learned that because the first device stores the device information of the first device, the second device stores the device information of the second device, and the cable stores the cable information of the cable, after any one or more link components of the first device, the second device, and the cable are replaced, and when the link training is performed again, the first device and the second device can further quickly obtain the device information of the first device, the cable information, and the device information of the second device. Therefore, the communication system can still implement the fast link training without initialization.

In an example, the device information specifically includes: a device identification code, a rate supported by a device (which includes a maximum working rate supported by the device), a maximum lane supported by the device, a printed circuit board (PCB) wire length, a material (which includes a material used to process the PCB), stacking (there is one piece of PCB in terms of appearance, but there are a plurality of layers inside the PCB, and the stacking is a quantity of layers inside the PCB), and a reserved parameter (Data); and the cable information specifically includes: a cable identification code, a rate supported by the cable (which includes a maximum working rate supported by the cable), a maximum lane supported by the cable, a loss (that is, an insertion loss, (IL)) during signal transmission, and a reserved parameter.

In this example, the cable information includes information representing the cable capability, and the device information includes information representing the device capability. Therefore, a maximum working rate supported by the first device can be determined based on the device information of the first device, the maximum working rate supported by the cable can be determined based on the cable information, and a maximum working rate supported by the second device can be determined based on the device information of the second device, so that the maximum working rate of the communication system is determined. However, an existing cable stores only cable information of a voltage and a current, which cannot be used for link training, that is, the existing cable stores no information that can be used for the link training. Therefore, the maximum working rate supported by the communication system cannot be determined when the link training is performed through the existing cable, and it is necessary to traverse a rate to try to obtain the maximum working rate supported by the communication system. Therefore, in this embodiment of the present disclosure, the maximum working rate of the communication system can be determined, and the fast link training is performed at the maximum working rate supported by the communication system. In addition, because the device information of the first device represents the capability of the first device, the cable information represents the cable capability, and the device information of the second device represents the capability of the second device, an equalization parameter can be further predicted based on the device information of the first device, the cable information, and the device information of the second device.

In a possible implementation, the cable information includes a rate supported by the cable, the device information of the first device includes a rate supported by the first device, and the device information of the second device includes a rate supported by the second device; and the performing link training between the first device and the second device based on the device information of the first device, the cable information, and the device information of the second device includes: determining a target training rate based on the device information of the first device, the cable information, and the device information of the second device; and performing first link training between the first device and the second device based on the target training rate.

In this embodiment of the present disclosure, a target rate of the communication system can be determined based on the device information of the first device, the cable information, and the device information of the second device, to implement the fast link training at the target rate. For example, the target rate may be the maximum working rate supported by the communication system. For example, the maximum working rate supported by the communication system is determined based on the device information of the first device, the cable information, and the device information of the second device, to implement the fast link training at the maximum working rate supported by the communication system, so that link training time can also be greatly reduced even under a link limit.

In a possible implementation, the first device and/or the second device are/is further configured to: detect, if any one of the device information of the first device, the cable information, or the device information of the second device is not obtained, whether a link component is removed or powered off after previous link training succeeds, where the link component includes the first device, the second device, or the cable; determine the target training rate based on a training result of the previous link training if the link component is not removed or powered off after the previous link training succeeds; and perform second link training between the first device and the second device if the link component is removed or powered off after the previous link training succeeds, where a training rate of the second link training is a preset rate. The preset rate is a prestored low rate, and the preset rate may be a lowest rate.

In this embodiment of the present disclosure, when any one of the device information of the first device, the cable information, and the device information of the second device is not obtained, it is detected whether the first device, the second device, or the cable is removed or powered off after the previous link training succeeds. If the first device, the second device, or the cable is not removed or powered off after the previous link training succeeds, it indicates that a result of the previous link training is still valid, and a target rate of current link training may be determined based on the training result of the previous link training, so that the fast link training at the target rate is implemented. For example, the maximum working rate supported by the communication system is determined based on the training result of the previous link training, and the fast link training is performed at the maximum working rate supported by the communication system. In addition, if the first device, the second device, or the cable is removed or powered off after the previous link training succeeds, the target rate cannot be determined because the device information of the first device, the cable information, or the device information of the second device is not obtained. As a result, the fast link training at the target rate cannot be implemented, and the link training is performed at a low rate, for example, the link training is performed at a lowest rate, to ensure that a training result of the link training is obtained.

In a possible implementation, the performing first link training between the first device and the second device based on the target training rate includes: searching an equalization parameter retrieval table based on the target training rate, to obtain a first sending equalization parameter value and a first receiving equalization parameter value, where the equalization parameter retrieval table records a training result of link training; and performing training interaction between the first device and the second device based on the first sending equalization parameter value and the first receiving equalization parameter value, to obtain a training result of the first link training.

In this embodiment of the present disclosure, the first device stores the equalization parameter retrieval table, and the second device also stores the equalization parameter retrieval table. The equalization parameter retrieval table records the training result of the link training, that is, the equalization parameter retrieval table records an equalization parameter value obtained through the link training. The equalization parameter value is a specific value of an equalization parameter, and the equalization parameter is a parameter that needs to be configured by an equalizer. The first device may search, based on the target training rate, the equalization parameter retrieval table stored in the first device, to obtain the first sending equalization parameter value and the first receiving equalization parameter value. Alternatively, the second device may search, based on the target training rate, the equalization parameter retrieval table stored in the second device, to obtain the first sending equalization parameter value and the first receiving equalization parameter value. After both the first device and the second device obtain the first sending equalization parameter value and the first receiving equalization parameter value, and if the first device is a transmit end and the second device is a receive end, the first device configures the first sending equalization parameter value, and the second device configures the first receiving equalization parameter value; and if the first device is the receive end and the second device is the transmit end, the first device configures the first receiving equalization parameter value, and the second device configures the first sending equalization parameter value. After both the first device and the second device configure the equalization parameter values, the first device and the second device perform training interaction, to obtain the training result of the first link training, so as to implement the fast link training. In addition, because the equalization parameter retrieval table records the training result of the link training, and if the link training has been performed previously based on the target rate, and the first device is not disconnected from the second device, the equalization parameter retrieval table records the training result of the link training at the target rate. If the link training needs to be performed based on the target rate again, the first sending equalization parameter value and the first receiving equalization parameter value at the target rate are directly and quickly read and configured in the equalization parameter retrieval table based on the target rate, to implement the fast link training in a specific scenario (that is, at a specific rate), and reduce the link training time.

In a possible implementation, the training result of the link training includes: a cable identification code of the cable; a rate supported by the communication system, a lane corresponding to each rate, a first equalization parameter value corresponding to each lane, and a reserved parameter when the first device is the transmit end and the second device is the receive end; and a rate supported by the communication system, a quantity of lanes corresponding to each rate, a first equalization parameter value corresponding to each lane, and a reserved parameter when the first device is the receive end and the second device is the transmit end, where the first equalization parameter value is obtained through the link training, and the first equalization parameter value includes the first sending equalization parameter value and the first receiving equalization parameter value.

In this embodiment of the present disclosure, the equalization parameter retrieval table records the rate supported by the communication system, the lane corresponding to each rate, and the first equalization parameter value corresponding to each lane when the first device is the transmit end and the second device is the receive end, or when the first device is the receive end and the second device is the transmit end. Therefore, for any case that the first device is the transmit end and the second device is the receive end, or the first device is the receive end and the second device is the transmit end, and for link training on any lane between the first device and the second device, both the first device and the second device can quickly search the equalization parameter retrieval table for a first equalization parameter based on the target rate.

In a possible implementation, the performing first link training between the first device and the second device based on the target training rate further includes: searching an equalization parameter prediction table based on the target training rate if the first sending equalization parameter value and the first receiving equalization parameter value are not found in the equalization parameter retrieval table, to obtain a second sending equalization parameter value and a second receiving equalization parameter value, where the equalization parameter prediction table records a prediction result of the link training; and performing training interaction between the first device and the second device based on the second sending equalization parameter value and the second receiving equalization parameter value, to obtain the training result of the first link training.

In this embodiment of the present disclosure, the first device stores the equalization parameter prediction table, and the second device also stores the equalization parameter prediction table. The equalization parameter prediction table records the prediction result of the link training, and the prediction result may include an equalization parameter that is derived or predicted based on loss information of each link component. When the first sending equalization parameter value and the first receiving equalization parameter value are not found in the equalization parameter retrieval table, the first device may search, based on the target training rate, the equalization parameter prediction table stored in the first device, to obtain the second sending equalization parameter value and the second receiving equalization parameter value. Alternatively, the second device may search, based on the target training rate, the equalization parameter prediction table stored in the second device, to obtain the second sending equalization parameter value and the second receiving equalization parameter value. After both the first device and the second device obtain the second sending equalization parameter value and the second receiving equalization parameter value, and if the first device is the transmit end and the second device is the receive end, the first device configures the second sending equalization parameter value, and the second device configures the second receiving equalization parameter value; and if the first device is the receive end and the second device is the transmit end, the first device configures the second receiving equalization parameter value, and the second device configures the second sending equalization parameter value. After both the first device and the second device configure the equalization parameter values, the first device and the second device perform training interaction, to obtain the training result of the first link training, so as to implement the fast link training. The equalization parameter prediction table records the prediction result of the link training, that is, records a predicted equalization parameter. Therefore, it is not necessary to complete link training and save related data before delivery of a device. A user can perform free networking on different devices as required, and can perform fast link training after the networking.

In a possible implementation, the first device and/or the second device are/is further configured to obtain the prediction result of the link training through prediction based on the device information of the first device, the cable information, and the device information of the second device, and record the prediction result of the link training in the equalization parameter prediction table.

In this embodiment of the present disclosure, after obtaining the device information of the first device, the cable information, and the device information of the second device, the first device obtains the prediction result of the link training through prediction based on the device information of the first device, the cable information, and the device information of the second device, and records the prediction result of the link training in the equalization parameter prediction table. After obtaining the device information of the first device, the cable information, and the device information of the second device, the second device also obtains the prediction result of the link training through prediction based on the device information of the first device, the cable information, and the device information of the second device, and records the prediction result of the link training in the equalization parameter prediction table. Therefore, it is helpful for the first device and the second device to quickly find the second sending equalization parameter and the second receiving equalization parameter in the equalization parameter prediction table based on the target rate.

In a possible implementation, the prediction result of the link training includes: a cable identification code of the cable; a rate supported by the communication system, a lane corresponding to each rate, a second equalization parameter value corresponding to each lane, and a reserved parameter when the first device is the transmit end and the second device is the receive end; and a rate supported by the communication system, a quantity of lanes corresponding to each rate, a second equalization parameter value corresponding to each lane, and a reserved parameter when the first device is the receive end and the second device is the transmit end, where the second equalization parameter value is obtained through prediction based on the device information of the first device, the cable information, and the device information of the second device, and the second equalization parameter value includes the second sending equalization parameter value and the second receiving equalization parameter value.

In this embodiment of the present disclosure, the equalization parameter prediction table records the rate supported by the communication system, the lane corresponding to each rate, and the second equalization parameter value corresponding to each lane when the first device is the transmit end and the second device is the receive end, or when the first device is the receive end and the second device is the transmit end. Therefore, for any case that the first device is the transmit end and the second device is the receive end, or the first device is the receive end and the second device is the transmit end, and for link training on any lane between the first device and the second device, both the first device and the second device can quickly search the equalization parameter prediction table for the second sending equalization parameter value and the second receiving equalization parameter value based on the target rate.

In a possible implementation, the training interaction includes: S1: configuring a target sending equalization parameter value, and sending a preset code type to the receive end; S2: configuring a target receiving equalization parameter value, and detecting whether the preset code type is received from the transmit end; S3: roughly adjusting, if the preset code type is not received from the transmit end, the receiving equalization parameter value configured by the receive end until the preset code type is received from the transmit end; S4: finely adjusting, if the preset code type is received from the transmit end, the receiving equalization parameter value configured by the receive end, to obtain the training result of the first link training; S5: sending the training result of the first link training to the transmit end; and S6: receiving the training result of the first link training from the receive end, where if the target sending equalization parameter value is the first sending equalization parameter value, the target receiving equalization parameter value is the first receiving equalization parameter value; and if the target sending equalization parameter value is the second sending equalization parameter value, the target receiving equalization parameter value is the second receiving equalization parameter value; the preset code type is a code type used for training interaction; if the first device is the transmit end and the second device is the receive end, the first device performs step S1 and step S6, and the second device performs step S2 to step S5; and if the second device is the transmit end and the first device is the receive end, the second device performs step S1 and step S6, and the first device performs step S2 to step S5. It should be understood that in existing link training, in a training interaction process, a sending equalization parameter value configured by the transmit end needs to be adjusted, and a receiving equalization parameter value configured by the receive end also needs to be adjusted, to obtain a training result of the link training.

In this embodiment of the present disclosure, in the training interaction process, the sending equalization parameter value of the transmit end remains unchanged, and the training result of the link training can be obtained only by adjusting the receiving equalization parameter value of the receive end. Therefore, in this embodiment of the present disclosure, the training interaction process consumes less time, so that the overall time consumed by the link training is small.

In a possible implementation, if the first link training fails, the first device and/or the second device are/is further configured to: perform second link training between the first device and the second device at the preset rate.

In this embodiment of the present disclosure, if no training result is obtained in the first link training, that is, no training result is obtained in the fast link training at a higher rate, the second link training is performed, that is, the link training is performed at a lower rate, for example, the link training is performed at a lowest rate. Therefore, it can be ensured that the training result of the link training is obtained.

In a possible implementation, after obtaining the training result of the first link training or obtaining a training result of the second link training, the first device and/or the second device are/is further configured to: update the equalization parameter retrieval table based on the training result of the first link training or the training result of the second link training.

In this embodiment of the present disclosure, if the first link training performed at the target rate succeeds, the equalization parameter retrieval table is updated based on the training result of the first link training, that is, an equalization parameter and the like in the training result of the first link training are recorded at a position corresponding to the target rate in the equalization parameter retrieval table. If the link training still needs to be performed at the target rate subsequently, the equalization parameter corresponding to the target rate can be directly found in the equalization parameter retrieval table, thereby improving a link training speed and implementing the fast link training. In addition, if the second link training performed at the lower rate succeeds, the equalization parameter retrieval table may also be updated based on the training result of the second link training, that is, an equalization parameter and the like in the training result of the second link training are recorded at a position corresponding to the lower rate in the equalization parameter retrieval table. If the link training still needs to be performed at the lower rate subsequently, the equalization parameter corresponding to the lower rate can be directly found in the equalization parameter retrieval table. For example, an equalization parameter obtained by performing link training at a lowest rate is recorded in the equalization parameter retrieval table, and when the link training needs to be performed at the lowest rate subsequently, the equalization parameter at the lowest rate can be quickly obtained, thereby improving the link training speed, and implementing the fast link training.

According to a second aspect, an embodiment of the present disclosure provides a first device, where the first device is connected to a second device through a cable, the cable stores cable information of the cable, and the cable information represents a cable capability; and the first device is configured to: obtain device information of the first device, obtain the cable information from the cable, and obtain device information of the second device, where the device information represents a device capability; and perform link training between the first device and the second device based on the device information of the first device, the cable information, and the device information of the second device.

In a possible implementation, the cable information includes a rate supported by the cable, the device information of the first device includes a rate supported by the first device, and the device information of the second device includes a rate supported by the second device; and the performing link training between the first device and the second device based on the device information of the first device, the cable information, and the device information of the second device includes: determining a target training rate based on the device information of the first device, the cable information, and the device information of the second device; and performing first link training between the first device and the second device based on the target training rate.

In a possible implementation, the first device is further configured to: detect, if any one of the device information of the first device, the cable information, or the device information of the second device is not obtained, whether a link component is removed or powered off after previous link training succeeds, where the link component includes the first device, the second device, or the cable; determine the target training rate based on a training result of the previous link training if the link component is not removed or powered off after the previous link training succeeds; and perform second link training between the first device and the second device if the link component is removed or powered off after the previous link training succeeds, where a training rate of the second link training is a preset rate.

In a possible implementation, the performing first link training between the first device and the second device based on the target training rate includes: searching an equalization parameter retrieval table based on the target training rate, to obtain a first sending equalization parameter value and a first receiving equalization parameter value, where the equalization parameter retrieval table records a training result of link training; and performing training interaction between the first device and the second device based on the first sending equalization parameter value and the first receiving equalization parameter value, to obtain a training result of the first link training.

In a possible implementation, the training result of the link training includes: a cable identification code of the cable; a rate supported by the communication system, a lane corresponding to each rate, a first equalization parameter value corresponding to each lane, and a reserved parameter when the first device is a transmit end and the second device is a receive end; and a rate supported by the communication system, a quantity of lanes corresponding to each rate, a first equalization parameter value corresponding to each lane, and a reserved parameter when the first device is the receive end and the second device is the transmit end, where the first equalization parameter value is obtained through the link training, and the first equalization parameter value includes the first sending equalization parameter value and the first receiving equalization parameter value.

In a possible implementation, the performing first link training between the first device and the second device based on the target training rate further includes: searching an equalization parameter prediction table based on the target training rate if the first sending equalization parameter value and the first receiving equalization parameter value are not found in the equalization parameter retrieval table, to obtain a second sending equalization parameter value and a second receiving equalization parameter value, where the equalization parameter prediction table records a prediction result of the link training; and performing training interaction between the first device and the second device based on the second sending equalization parameter value and the second receiving equalization parameter value, to obtain the training result of the first link training.

In a possible implementation, the first device is further configured to obtain the prediction result of the link training through prediction based on the device information of the first device, the cable information, and the device information of the second device, and record the prediction result of the link training in the equalization parameter prediction table.

In a possible implementation, the prediction result of the link training includes: a cable identification code of the cable; a rate supported by the communication system, a lane corresponding to each rate, a second equalization parameter value corresponding to each lane, and a reserved parameter when the first device is the transmit end and the second device is the receive end; and a rate supported by the communication system, a quantity of lanes corresponding to each rate, a second equalization parameter value corresponding to each lane, and a reserved parameter when the first device is the receive end and the second device is the transmit end, where the second equalization parameter value is obtained through prediction based on the device information of the first device, the cable information, and the device information of the second device, and the second equalization parameter value includes the second sending equalization parameter value and the second receiving equalization parameter value.

In a possible implementation, the training interaction includes: configuring a target sending equalization parameter value, and sending a preset code type to the second device; and receiving the training result of the first link training from the second device, where if the target sending equalization parameter value is the first sending equalization parameter value or the second sending equalization parameter value; and the preset code type is a code type used for training interaction.

In a possible implementation, if the first link training fails, the first device is further configured to: perform second link training between the first device and the second device at the preset rate.

In a possible implementation, after obtaining the training result of the first link training or obtaining a training result of the second link training, the first device is further configured to: update the equalization parameter retrieval table based on the training result of the first link training or the training result of the second link training.

According to a third aspect, an embodiment of the present disclosure provides a second device, where the second device is connected to a first device through a cable, the cable stores cable information of the cable, and the cable information represents a cable capability; and the second device is configured to: obtain device information of the first device, obtain the cable information from the cable, and obtain device information of the second device, where the device information represents a device capability; and perform link training between the first device and the second device based on the device information of the first device, the cable information, and the device information of the second device.

In a possible implementation, the cable information includes a rate supported by the cable, the device information of the first device includes a rate supported by the first device, and the device information of the second device includes a rate supported by the second device; and the performing link training between the first device and the second device based on the device information of the first device, the cable information, and the device information of the second device includes: determining a target training rate based on the device information of the first device, the cable information, and the device information of the second device; and performing first link training between the first device and the second device based on the target training rate.

In a possible implementation, the second device is further configured to: detect, if any one of the device information of the first device, the cable information, or the device information of the second device is not obtained, whether a link component is removed or powered off after previous link training succeeds, where the link component includes the first device, the second device, or the cable; determine the target training rate based on a training result of the previous link training if the link component is not removed or powered off after the previous link training succeeds; and perform second link training between the first device and the second device if the link component is removed or powered off after the previous link training succeeds, where a training rate of the second link training is a preset rate.

In a possible implementation, the performing first link training between the first device and the second device based on the target training rate includes: searching an equalization parameter retrieval table based on the target training rate, to obtain a first sending equalization parameter value and a first receiving equalization parameter value, where the equalization parameter retrieval table records a training result of link training; and performing training interaction between the first device and the second device based on the first sending equalization parameter value and the first receiving equalization parameter value, to obtain a training result of the first link training.

In a possible implementation, the training result of the link training includes: a cable identification code of the cable; a rate supported by the communication system, a lane corresponding to each rate, a first equalization parameter value corresponding to each lane, and a reserved parameter when the first device is a transmit end and the second device is a receive end; and a rate supported by the communication system, a quantity of lanes corresponding to each rate, a first equalization parameter value corresponding to each lane, and a reserved parameter when the first device is the receive end and the second device is the transmit end, where the first equalization parameter value is obtained through the link training, and the first equalization parameter value includes the first sending equalization parameter value and the first receiving equalization parameter value.

In a possible implementation, the performing first link training between the first device and the second device based on the target training rate further includes: searching an equalization parameter prediction table based on the target training rate if the first sending equalization parameter value and the first receiving equalization parameter value are not found in the equalization parameter retrieval table, to obtain a second sending equalization parameter value and a second receiving equalization parameter value, where the equalization parameter prediction table records a prediction result of the link training; and performing training interaction between the first device and the second device based on the second sending equalization parameter value and the second receiving equalization parameter value, to obtain the training result of the first link training.

In a possible implementation, the second device is further configured to obtain the prediction result of the link training through prediction based on the device information of the first device, the cable information, and the device information of the second device, and record the prediction result of the link training in the equalization parameter prediction table.

In a possible implementation, the prediction result of the link training includes: a cable identification code of the cable; a rate supported by the communication system, a lane corresponding to each rate, a second equalization parameter value corresponding to each lane, and a reserved parameter when the first device is the transmit end and the second device is the receive end; and a rate supported by the communication system, a quantity of lanes corresponding to each rate, a second equalization parameter value corresponding to each lane, and a reserved parameter when the first device is the receive end and the second device is the transmit end, where the second equalization parameter value is obtained through prediction based on the device information of the first device, the cable information, and the device information of the second device, and the second equalization parameter value includes the second sending equalization parameter value and the second receiving equalization parameter value.

In a possible implementation, the training interaction includes: configuring a target receiving equalization parameter value, and detecting whether a preset code type is received from the first device; roughly adjusting, if the preset code type is not received from the first device, the receiving equalization parameter value configured by the second device until the preset code type is received from the first device; finely adjusting, if the preset code type is received from the first device, the receiving equalization parameter value configured by the second device, to obtain the training result of the first link training; and sending the training result of the first link training to the first device, where the target receiving equalization parameter value is the first receiving equalization parameter value or the second receiving equalization parameter value; and the preset code type is a code type used for training interaction.

In a possible implementation, if the first link training fails, the second device is further configured to: perform second link training between the first device and the second device at the preset rate.

In a possible implementation, after obtaining the training result of the first link training or obtaining a training result of the second link training, the second device is further configured to: update the equalization parameter retrieval table based on the training result of the first link training or the training result of the second link training.

According to a fourth aspect, an embodiment of the present disclosure provides a link training method, applied to an electronic apparatus, where the electronic apparatus is a first device or a second device in a communication system, the first device and the second device are connected through a cable, the cable stores cable information of the cable, and the cable information represents a cable capability; and the method includes: obtaining device information of the first device, obtaining the cable information from the cable, and obtaining device information of the second device, where the device information represents a device capability; and performing link training between the first device and the second device based on the device information of the first device, the cable information, and the device information of the second device.

In a possible implementation, the cable information includes a rate supported by the cable, the device information of the first device includes a rate supported by the first device, and the device information of the second device includes a rate supported by the second device; and the performing link training between the first device and the second device based on the device information of the first device, the cable information, and the device information of the second device includes: determining a target training rate based on the device information of the first device, the cable information, and the device information of the second device; and performing first link training between the first device and the second device based on the target training rate.

In a possible implementation, the method further includes: detecting, if any one of the device information of the first device, the cable information, or the device information of the second device is not obtained, whether a link component is removed or powered off after previous link training succeeds, where the link component includes the first device, the second device, or the cable; determining the target training rate based on a training result of the previous link training if the link component is not removed or powered off after the previous link training succeeds; and performing second link training between the first device and the second device if the link component is removed or powered off after the previous link training succeeds, where a training rate of the second link training is a preset rate.

In a possible implementation, the performing first link training between the first device and the second device based on the target training rate includes: searching an equalization parameter retrieval table based on the target training rate, to obtain a first sending equalization parameter value and a first receiving equalization parameter value, where the equalization parameter retrieval table records a training result of link training; and performing training interaction between the first device and the second device based on the first sending equalization parameter value and the first receiving equalization parameter value, to obtain a training result of the first link training.

In a possible implementation, the training result of the link training includes: a cable identification code of the cable; a rate supported by the communication system, a lane corresponding to each rate, a first equalization parameter value corresponding to each lane, and a reserved parameter when the first device is a transmit end and the second device is a receive end; and a rate supported by the communication system, a quantity of lanes corresponding to each rate, a first equalization parameter value corresponding to each lane, and a reserved parameter when the first device is the receive end and the second device is the transmit end, where the first equalization parameter value is obtained through the link training, and the first equalization parameter value includes the first sending equalization parameter value and the first receiving equalization parameter value.

In a possible implementation, the method further includes: searching an equalization parameter prediction table based on the target training rate if the first sending equalization parameter value and the first receiving equalization parameter value are not found in the equalization parameter retrieval table, to obtain a second sending equalization parameter value and a second receiving equalization parameter value, where the equalization parameter prediction table records a prediction result of the link training; and performing training interaction between the first device and the second device based on the second sending equalization parameter value and the second receiving equalization parameter value, to obtain the training result of the first link training.

In a possible implementation, the method further includes: obtaining the prediction result of the link training through prediction based on the device information of the first device, the cable information, and the device information of the second device, and recording the prediction result of the link training in the equalization parameter prediction table.

In a possible implementation, the prediction result of the link training includes: a cable identification code of the cable; a rate supported by the communication system, a lane corresponding to each rate, a second equalization parameter value corresponding to each lane, and a reserved parameter when the first device is the transmit end and the second device is the receive end; and a rate supported by the communication system, a quantity of lanes corresponding to each rate, a second equalization parameter value corresponding to each lane, and a reserved parameter when the first device is the receive end and the second device is the transmit end, where the second equalization parameter value is obtained through prediction based on the device information of the first device, the cable information, and the device information of the second device, and the second equalization parameter value includes the second sending equalization parameter value and the second receiving equalization parameter value.

In a possible implementation, if the electronic apparatus is a transmit end, the training interaction includes: configuring a target sending equalization parameter value, and sending a preset code type to a receive end, where the receive end configures a target receiving equalization parameter value; and receiving the training result of the first link training from the receive end; or if the electronic apparatus is the receive end, the training interaction includes: configuring the target receiving equalization parameter value, and detecting whether the preset code type is received from the transmit end, where the transmit end configures the target sending equalization parameter value; roughly adjusting, if the preset code type is not received from the transmit end, the configured receiving equalization parameter value until the preset code type from the transmit end is detected; and finely adjusting, if the preset code type is received from the transmit end, the configured receiving equalization parameter value, to obtain the training result of the first link training, where if the transmit end is the first device, the receive end is the second device; and if the transmit end is the second device, the receive end is the first device; if the target sending equalization parameter value is the first sending equalization parameter value, the target receiving equalization parameter value is the first receiving equalization parameter value; and if the target sending equalization parameter value is the second sending equalization parameter value, the target receiving equalization parameter value is the second receiving equalization parameter value; and the preset code type is a code type used for training interaction.

In a possible implementation, if the first link training fails, the method further includes: performing second link training between the first device and the second device at the preset rate.

In a possible implementation, after the training result of the first link training is obtained or a training result of the second link training is obtained, the method further includes: updating the equalization parameter retrieval table based on the training result of the first link training or the training result of the second link training.

According to a fifth aspect, an embodiment of the present disclosure provides a link training apparatus, used in an electronic apparatus, where the electronic apparatus is a first device or a second device in a communication system, the first device and the second device are connected through a cable, the cable stores cable information of the cable, and the cable information represents a cable capability; and the link training apparatus includes: an obtaining unit configured to obtain device information of the first device, obtain the cable information from the cable, and obtain device information of the second device, where the device information represents a device capability; and a training unit configured to perform link training between the first device and the second device based on the device information of the first device, the cable information, and the device information of the second device.

In a possible implementation, the cable information includes a rate supported by the cable, the device information of the first device includes a rate supported by the first device, and the device information of the second device includes a rate supported by the second device; and the training unit is specifically configured to: determine a target training rate based on the device information of the first device, the cable information, and the device information of the second device; and perform first link training between the first device and the second device based on the target training rate.

In a possible implementation, the training unit is further configured to: detect, if any one of the device information of the first device, the cable information, or the device information of the second device is not obtained, whether a link component is removed or powered off after previous link training succeeds, where the link component includes the first device, the second device, or the cable; determine the target training rate based on a training result of the previous link training if the link component is not removed or powered off after the previous link training succeeds; and perform second link training between the first device and the second device if the link component is removed or powered off after the previous link training succeeds, where a training rate of the second link training is a preset rate.

In a possible implementation, the training unit is specifically configured to: search an equalization parameter retrieval table based on the target training rate, to obtain a first sending equalization parameter value and a first receiving equalization parameter value, where the equalization parameter retrieval table records a training result of link training; and perform training interaction between the first device and the second device based on the first sending equalization parameter value and the first receiving equalization parameter value, to obtain a training result of the first link training.

In a possible implementation, the training result of the link training includes: a cable identification code of the cable; a rate supported by the communication system, a lane corresponding to each rate, a first equalization parameter value corresponding to each lane, and a reserved parameter when the first device is a transmit end and the second device is a receive end; and a rate supported by the communication system, a quantity of lanes corresponding to each rate, a first equalization parameter value corresponding to each lane, and a reserved parameter when the first device is the receive end and the second device is the transmit end, where the first equalization parameter value is obtained through the link training, and the first equalization parameter value includes the first sending equalization parameter value and the first receiving equalization parameter value.

In a possible implementation, the training unit is further configured to: search an equalization parameter prediction table based on the target training rate if the first sending equalization parameter value and the first receiving equalization parameter value are not found in the equalization parameter retrieval table, to obtain a second sending equalization parameter value and a second receiving equalization parameter value, where the equalization parameter prediction table records a prediction result of the link training; and perform training interaction between the first device and the second device based on the second sending equalization parameter value and the second receiving equalization parameter value, to obtain the training result of the first link training.

In a possible implementation, the training unit is further configured to: obtain the prediction result of the link training through prediction based on the device information of the first device, the cable information, and the device information of the second device, and record the prediction result of the link training in the equalization parameter prediction table.

In a possible implementation, the prediction result of the link training includes: a cable identification code of the cable; a rate supported by the communication system, a lane corresponding to each rate, a second equalization parameter value corresponding to each lane, and a reserved parameter when the first device is the transmit end and the second device is the receive end; and a rate supported by the communication system, a quantity of lanes corresponding to each rate, a second equalization parameter value corresponding to each lane, and a reserved parameter when the first device is the receive end and the second device is the transmit end, where the second equalization parameter value is obtained through prediction based on the device information of the first device, the cable information, and the device information of the second device, and the second equalization parameter value includes the second sending equalization parameter value and the second receiving equalization parameter value.

In a possible implementation, if the electronic apparatus is a transmit end, the training interaction includes: configuring a target sending equalization parameter value, and sending a preset code type to a receive end, where the receive end configures a target receiving equalization parameter value; and receiving the training result of the first link training from the receive end; or if the electronic apparatus is the receive end, the training interaction includes: configuring the target receiving equalization parameter value, and detecting whether the preset code type is received from the transmit end, where the transmit end configures the target sending equalization parameter value; roughly adjusting, if the preset code type is not received from the transmit end, the configured receiving equalization parameter value until the preset code type from the transmit end is detected; and finely adjusting, if the preset code type is received from the transmit end, the configured receiving equalization parameter value, to obtain the training result of the first link training, where if the transmit end is the first device, the receive end is the second device; and if the transmit end is the second device, the receive end is the first device; if the target sending equalization parameter value is the first sending equalization parameter value, the target receiving equalization parameter value is the first receiving equalization parameter value; and if the target sending equalization parameter value is the second sending equalization parameter value, the target receiving equalization parameter value is the second receiving equalization parameter value; and the preset code type is a code type used for training interaction.

In a possible implementation, if the first link training fails, the training unit is further configured to: perform second link training between the first device and the second device at the preset rate.

In a possible implementation, after obtaining the training result of the first link training or obtaining a training result of the second link training, the training unit is further configured to: update the equalization parameter retrieval table based on the training result of the first link training or the training result of the second link training.

According to a sixth aspect, an embodiment of the present disclosure provides an electronic device, including a processor, a memory, a communication interface, and one or more programs, where the one or more programs are stored in the memory and are configured to be executed by the processor, and the program includes instructions used to perform steps in the method according to any one of the fourth aspect.

According to a seventh aspect, an embodiment of the present disclosure provides a link training apparatus, including: a processor and a transmission interface, where the processor is configured to invoke program instructions stored in a memory, to enable the link training apparatus to perform the method according to any one of the fourth aspect.

According to an eighth aspect, an embodiment of the present disclosure provides a computer-readable storage medium, where the computer-readable storage medium stores a computer program used for electronic data exchange, and the computer program enables a computer to perform the method according to any one of the fourth aspect.

According to a ninth aspect, an embodiment of the present disclosure provides a computer program. The computer program enables a computer or a processor to perform the method according to any one of the fourth aspect.

DESCRIPTION OF EMBODIMENTS

To make a person skilled in the art understand the technical solutions in the present disclosure better, the following clearly and completely describes the technical solutions in embodiments of the present disclosure with reference to the accompanying drawings in embodiments of the present disclosure. It is clear that, the described embodiments are merely a part rather than all of embodiments of the present disclosure. All other embodiments obtained by a person skilled in the art based on embodiments of the present disclosure without creative efforts shall fall within the protection scope of the present disclosure.

Terms "include" and "have" and any transformation thereof in the specification, claims, and accompanying drawings of the present disclosure are intended to cover non-exclusive including. For example, a process, a method, a system, a product, or a device that includes a series of steps or units is not limited to the listed steps or units, but optionally further includes other unlisted steps or units, or optionally further includes another inherent step or unit of the process, the method, the product, or the device.

"Embodiment" mentioned in the specification means that particular features, structures, or characteristics described with reference to the embodiment may be included in at least one embodiment of the present disclosure. The phase occurred at different locations in the specification does not necessarily refer to a same embodiment, or an independent or alternate embodiment exclusive of another embodiment. A person skilled in the art explicitly or implicitly understands that an embodiment described in the specification may be combined with another embodiment.

To facilitate understanding of embodiments of the present disclosure, related knowledge in the present disclosure is first described herein.

Figure 1:
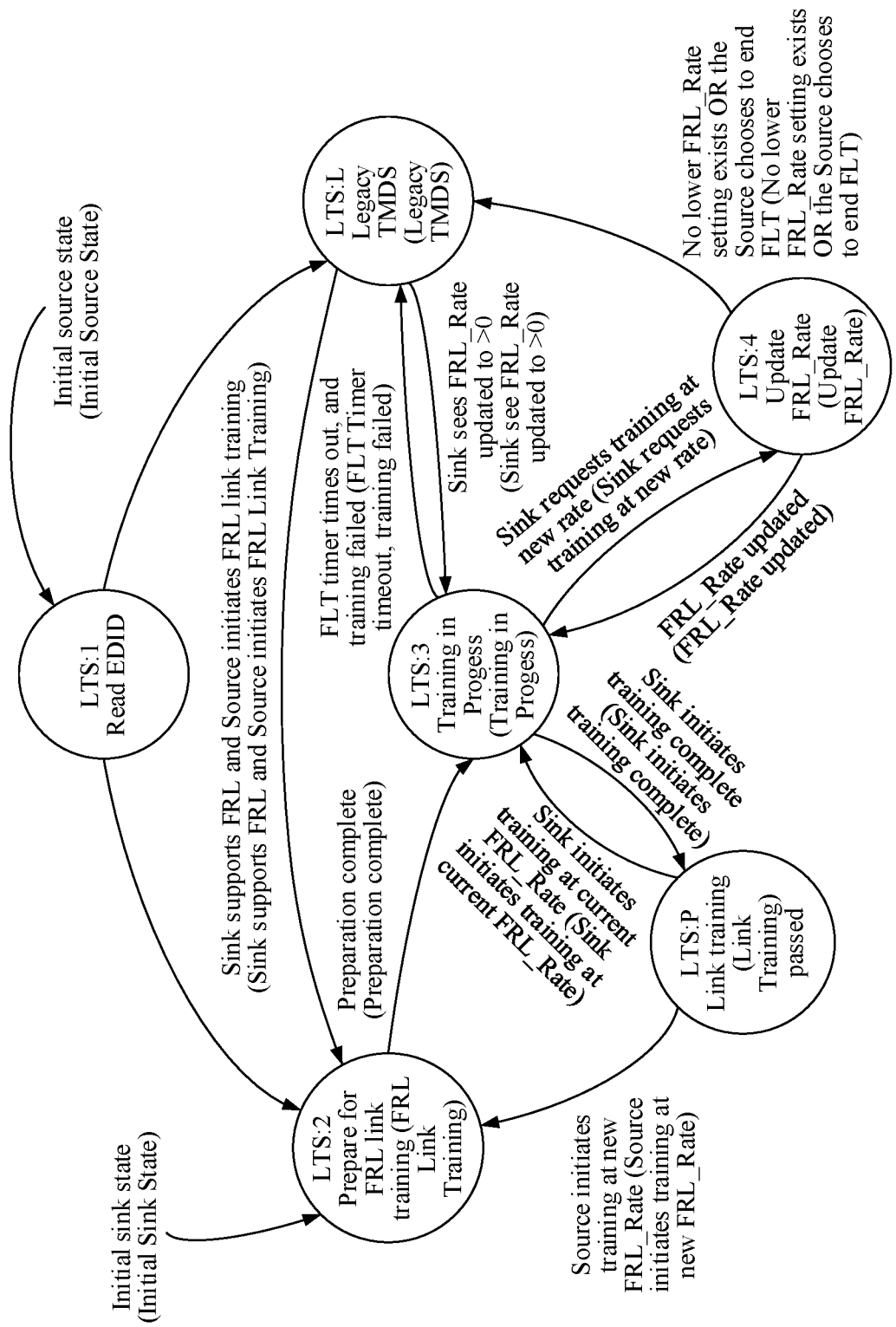
FIG. 1 is a schematic diagram of a state of High Definition Multimedia Interface (HDMI) link training according to an embodiment of the present disclosure.

First, in existing high-definition multimedia interface link training, namely, in conventional serializer/deserializer (SerDes) link training currently used in various protocols, an access source device (Source) and an access end device (Sink) traverse parameters through continuous interaction, and finally achieve an optimal link equalization state. FIG. 1 is a schematic diagram of a state of high-definition multimedia interface link training according to an embodiment of the present disclosure. The high-definition multimedia interface link training has the following disadvantages.

(1) A training rate cannot be obtained through conventional link training. When the training rate is switched, a low-speed lane handshake is used, and low-speed signal interaction is used. In other words, information exchange between the access source device and the access end device is that information is sent through a low-speed signal cable. A low-speed signal of a high-definition multimedia interface is transmitted through an Inter-Integrated Circuit (I2C) bus. When a device requires another device to adjust a configuration, the device needs to notify the another device by using the low-speed signal. As a result, waiting time is greatly increased, and total training time is further prolonged.

(2) When a lane is poor, training time of a link training state (LTS): 3 is long, and a combination of a feed forward equalizer (FFE), a continuous time linear equalizer (CTLE), and a decision feedback equalizer (DFE) needs to be traversed. The HDMI 2.1 protocol, four groups of FFEs, 32 groups of CTLEs, and 32 groups of DFEs are used as an example, and 4086 combinations need to be traversed. Rough adjustment also requires to traverse 4×16×16=1024 combinations or 4×8×8=256 combinations.

(3) Because lane information cannot be obtained in advance, LTS:3 and LTS:4 are switched back and forth, which may cause rate traversal. The HDMI 2.1 protocol and five rates are used as an example. 4086×5 combinations need to be traversed. The rough adjustment also requires to traverse 1024×5 combinations or 256×5 combinations.

In addition, there is another link training, for a fixed system, that uses an equalization parameter value stored in a non-volatile memory instead of performing a new equalization process. Before a product is delivered, a conventional link training process is first performed, and a result is stored in the non-volatile memory. When a user uses the process, no training is performed, and data stored in the non-volatile memory is directly invoked. The link training has the following disadvantages.

(1) A link component is not replaceable and is applicable to only a fixed system. To be specific, product forms of an upstream device, a lane, and a downstream device do not change greatly. If there is a large change, the system needs to be initialized again, and a quick training method completely fails.

Figure 2:
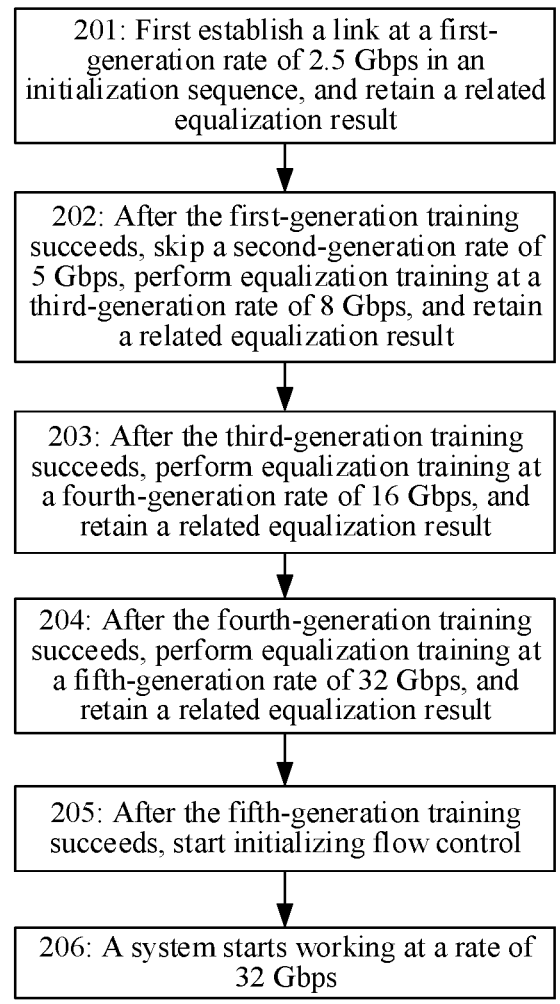
FIG. 2 is a schematic flowchart of initialization of a high-speed serial computer extended bus standard (Peripheral Component Interconnect Express, PCI-Express, and PCIe for short) according to an embodiment of the present disclosure.

(2) An equalization parameter cannot be predicted. Link training needs to be completed and data needs to be saved before delivery of a device. FIG. 2 is a schematic flowchart of initialization thereof.

FIG. 2 is a schematic flowchart of initialization of a high-speed serial computer extended bus standard according to an embodiment of the present disclosure. The high-speed serial computer extended bus standard is now updated to a fifth-generation. Before delivery, a round of initialization is first performed on a device that adopts the high-speed serial computer extended bus standard, and a related parameter is retained. Details are as follows:

Step 201: First establish a link at a first-generation rate of 2.5 Gbps in an initialization sequence, and retain a related equalization result.

Step 202: After the first-generation training succeeds, skip a second-generation rate of 5 Gbps, perform equalization training at a third-generation rate of 8 Gbps, and retain a related equalization result.

Step 203: After the third-generation training succeeds, perform equalization training at a fourth-generation rate of 16 Gbps, and retain a related equalization result.

Step 204: After the fourth-generation training succeeds, perform equalization training at a fifth-generation rate of 32 Gbps, and retain a related equalization result.

Step 205: After the fifth-generation training succeeds, start initializing flow control.

Step 206: A system starts working at a rate of 32 Gbps.

It can be learned from FIG. 2 that, a processing method for a case that link training fails is not given, and the link training cannot be applied to an actual product.

In view of the disadvantages of the foregoing link training, an embodiment of the present disclosure provides a high-precision fast link training solution based on cable information of a cable stored in the cable, a replaceable link component (which includes a first device, a second device, and the cable), and a predictable equalization parameter.

The following describes the technical solutions provided in the present disclosure in detail with reference to specific implementations.

Figure 3:
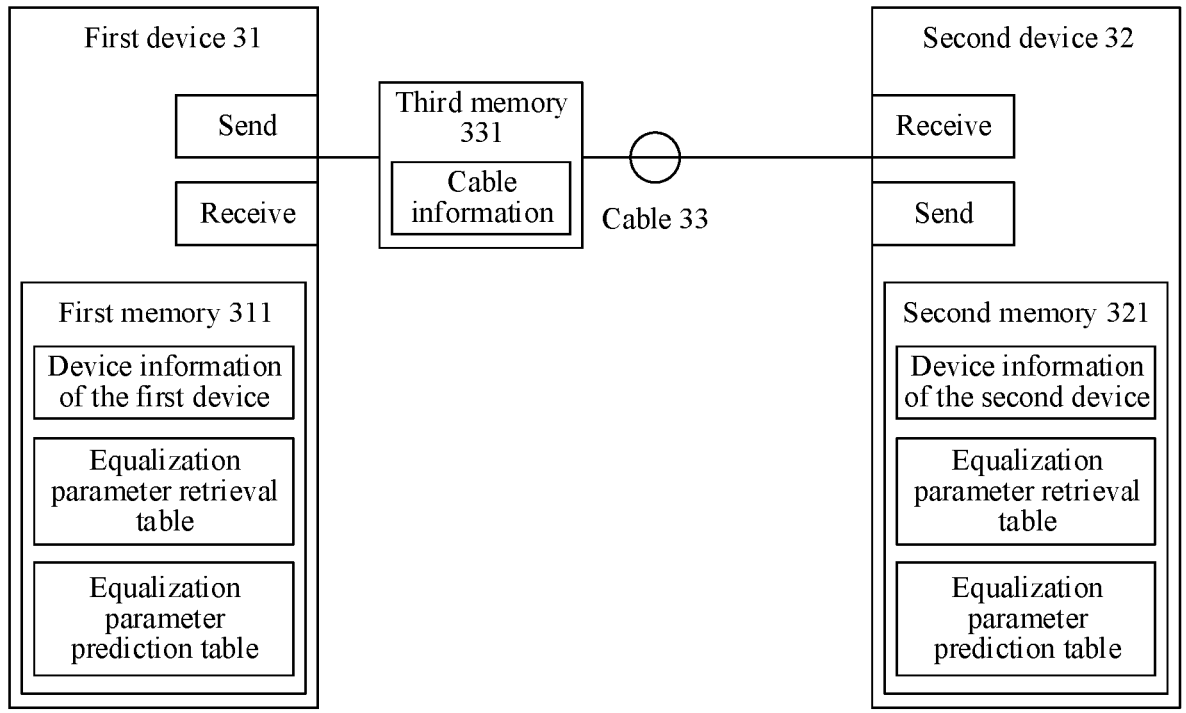
FIG. 3 is a schematic diagram of an architecture of a communication system according to an embodiment of the present disclosure.

FIG. 3 is a schematic diagram of an architecture of a communication system according to an embodiment of the present disclosure. As shown in FIG. 3, the communication system includes a first device 31, a second device 32, and a cable 33 that connects the first device 31 and the second device 32. The cable 33 stores cable information of the cable 33, and the cable information represents a cable capability. The first device 31 is configured to obtain device information of the first device 31, obtain the cable information from the cable 33, and obtain device information of the second device 32, where the device information represents a device capability. The first device 31 and/or the second device 32 are/is further configured to perform link training between the first device 31 and the second device 32 based on the device information of the first device 31, the cable information, and the device information of the second device 32. The first device 31 is configured to obtain the device information of the first device 31, obtain the cable information from the cable 33, and obtain the device information of the second device 32. The first device 31 and/or the second device 32 are/is further configured to perform link training between the first device 31 and the second device 32 based on the device information of the first device 31, the cable information, and the device information of the second device 32.

The communication system may be used in scenarios such as a HDMI, a Universal Serial Bus (USB), and a new scenario. For the HDMI, the first device 31 and the second device 32 are access source devices or access end devices. For the USB, the first device 31 and the second device 32 are hosts (Hosts) or storage devices. In an optional case, the first device 31 and the second device 32 are routers or nodes (Peers).

In this embodiment of the present disclosure, the first device 31 stores the device information of the first device 31, the second device 32 stores the device information of the second device 32, the first device 31 and the second device 32 are connected through the cable 33, and the cable 33 stores the cable information of the cable 33. Link training may be triggered by the first device 31 or may be triggered by the second device 32. During link training, the first device 31 obtains the device information of the first device 31 that is stored in the first device, obtains the cable information from the cable 33, and obtains the device information of the second device 32 from the second device 32. The second device 32 obtains the device information of the second device 32 that is stored in the second device, obtains the cable information from the cable 33, and obtains the device information of the first device 31 from the first device 31. After obtaining the device information of the first device 31, the cable information, and the device information of the second device 32, both the first device 31 and the second device 32 may perform link training between the first device 31 and the second device 32 based on the device information of the first device 31, the cable information, and the device information of the second device 32. For example, both the first device 31 and the second device 32 may determine, based on the device information of the first device 31, the cable information, and the device information of the second device 32, a maximum working rate supported by the communication system, and perform fast link training between the first device 31 and the second device 32 at the maximum working rate.

After the communication system starts, both the first device 31 and the second device 32 detect whether the cable 33 is inserted, in other words, the first device 31 detects whether the cable 33 is connected to the first device, and the second device 32 also detects whether the cable 33 is connected to the second device. If either of the first device 31 and the second device 32 detects that the cable 33 is not inserted, either of the first device 31 and the second device 32 keeps performing detection. If the first device 31 detects that the cable 33 is inserted, the first device 31 obtains the cable information from the cable 33. In addition, if the cable 33 is also inserted into the second device 32, the first device 31 also obtains the device information of the second device 32 from the second device 32. Similarly, if the second device 32 detects that the cable 33 is inserted, the second device 32 obtains the cable information from the cable 33. In addition, if the cable 33 is also inserted into the first device 31, the second device 32 also obtains the device information of the first device 31 from the first device 31.

Specifically, the first device 31 includes a first memory 311, and the first memory 311 stores the device information of the first device 31. The second device 32 includes a second memory 321, and the second memory 321 stores the device information of the second device 32. The cable 33 includes a third memory 331, and the third memory 331 stores the cable information of the cable 33. During link training, the first device 31 reads the device information of the first device 31 from the first memory 311, obtains the cable information from the third memory 331, and obtains the device information of the second device 32 from the second memory 321. The second device 32 reads the device information of the second device 32 from the second memory 321, obtains the cable information from the third memory 331, and obtains the device information of the first device 31 from the first memory 311.

The first memory 311, the second memory 321, and the third memory 331 may be non-volatile memories. The cable 33 may include one or more third memories 331, and the third memories 331 may be specifically located in connectors at two ends of the cable 33 or in the cable 33. For example, the cable 33 may include one or more non-volatile memories, and the one or more non-volatile memories are located in the connectors at two ends of the cable 33 or in the cable 33.

In an example, the cable information includes the information representing the cable capability, and the device information includes the information representing the device capability.

Specifically, the device information and the cable information may be stored in the memories in a form of a table. The device information of the first device 31 is shown in Table 1, the device information of the second device 32 is shown in Table 2, and the cable information of the cable 33 is shown in Table 3. The device information includes information such as a device identification code, a rate supported by a device (which includes a maximum working rate supported by the device), a maximum lane supported by the device, a PCB wire length, a material (which includes a material used to process the PCB), stacking (there is one piece of PCB in terms of appearance, but there are a plurality of layers inside the PCB), and a reserved parameter (Data). The cable information includes information such as a cable identification code, a rate supported by the cable (which includes a maximum working rate supported by the cable), a maximum lane supported by the cable, a loss (namely, an IL) during signal transmission, and a reserved parameter.

TABLE 1

Device information table of the first device 31
Device information table of the first device 31

| Identification code | Maximum working rate (Max Rate) | Maximum lane (Max Lane) | Rate (Rate) | Printed circuit board (PCB) wire length | Material | Stacking | Reserved parameter x (Data x) |
|---|---|---|---|---|---|---|---|
| xxx | xxx | xxx | 2 Gbps | xxx | xxx | xxx | xxx |
| | | | 4 Gbps | xxx | xxx | xxx | xxx |
| | | | 6 Gbps | xxx | xxx | xxx | xxx |
| | | | 8 Gbps | xxx | xxx | xxx | xxx |
| | | | 12 Gbps | xxx | xxx | xxx | xxx |
| | | | 16 Gbps | xxx | xxx | xxx | xxx |
| | | | 24 Gbps | xxx | xxx | xxx | xxx |
| | | | 32 Gbps | xxx | xxx | xxx | xxx |
| | | | ... | ... | ... | ... | ... |

TABLE 2

Device information table of the second device 32
Device information table of the second device 32

| Identification code | Maximum working rate (Max Rate) | Maximum lane (Max Lane) | Rate (Rate) | Printed circuit board (PCB) wire length | Material | Stacking | Reserved parameter x (Data x) |
|---|---|---|---|---|---|---|---|
| xxx | xxx | xxx | 2 Gbps | xxx | xxx | xxx | xxx |
| | | | 4 Gbps | xxx | xxx | xxx | xxx |
| | | | 6 Gbps | xxx | xxx | xxx | xxx |
| | | | 8 Gbps | xxx | xxx | xxx | xxx |

TABLE 2-continued

Device information table of the second device 32

| Identification code | Maximum working rate (Max Rate) | Maximum lane (Max Lane) | Rate (Rate) | Printed circuit board (PCB) wire length | Material | Stacking | Reserved parameter x (Data x) |
|---|---|---|---|---|---|---|---|
| | | | 12 Gbps | xxx | xxx | xxx | xxx |
| | | | 16 Gbps | xxx | xxx | xxx | xxx |
| | | | 24 Gbps | xxx | xxx | xxx | xxx |
| | | | 32 Gbps | xxx | xxx | xxx | xxx |
| | | | . . . | . . . | . . . | . . . | . . . |

TABLE 3

Cable information table of the cable 33

| Identification code | Maximum working rate (Max Rate) | Maximum lane (Max Lane) | Rate (Rate) | Loss (IL) during signal transmission | Reserved parameter 1 (Data 1) | Reserved parameter 2 (Data 2) | Reserved parameter x (Data x) |
|---|---|---|---|---|---|---|---|
| xxx | xxx | xxx | 2 Gbps | xxx | xxx | xxx | xxx |
| | | | 4 Gbps | xxx | xxx | xxx | xxx |
| | | | 6 Gbps | xxx | xxx | xxx | xxx |
| | | | 8 Gbps | xxx | xxx | xxx | xxx |
| | | | 12 Gbps | xxx | xxx | xxx | xxx |
| | | | 16 Gbps | xxx | xxx | xxx | xxx |
| | | | 24 Gbps | xxx | xxx | xxx | xxx |
| | | | 32 Gbps | xxx | xxx | xxx | xxx |
| | | | . . . | . . . | . . . | . . . | . . . |

"xxx" in Table 1, Table 2, and Table 3 represents a specific parameter value.

In this example, the cable information includes the information representing the cable capability, and the device information includes the information representing the device capability. Therefore, the maximum working rate supported by the first device 31 can be determined based on the device information of the first device 31, the maximum working rate supported by the cable 33 can be determined based on the cable information, and the maximum working rate supported by the second device 32 can be determined based on the device information of the second device 32, so that the maximum working rate of the communication system is determined. However, an existing cable stores only cable information of a voltage and a current, which cannot be used for link training, in other words, the existing cable stores no information that can be used for link training. Therefore, the maximum working rate supported by the communication system cannot be determined when the link training is performed based on the existing cable, and it is necessary to traverse rates to try to obtain the maximum working rate supported by the communication system. Therefore, in this embodiment of the present disclosure, the maximum working rate of the communication system can be determined, and fast link training is performed at the maximum working rate supported by the communication system. In addition, because the device information of the first device 31 represents a capability of the first device 31, the cable information represents a capability of the cable 33, and the device information of the second device 32 represents a capability of the second device 32, an equalization parameter can be further predicted based on the device information of the first device 31, the cable information, and the device information of the second device 32.

It should be noted that, because the cable in the conventional technology is a black box, if the cable is replaced, the system cannot know what the cable is replaced with, and needs to be re-initialized. However, in this embodiment of the present disclosure, each component of a link has a training record of the component; and even if the cable is replaced, information related to link training can be further found. Even for a new cable that has not been used for link training, an equalization parameter of the system can also be predicted based on loss information of the cable.

It can be learned that because the first device 31 stores the device information of the first device 31, the second device 32 stores the device information of the second device 32, and the cable 33 stores the cable information of the cable 33, after any one or more link components of the first device 31, the second device 32, and the cable 33 are replaced, and when the link training is performed again, the first device 31 and the second device 32 can further quickly obtain the device information of the first device 31, the cable information, and the device information of the second device 32. Therefore, the communication system can still implement the fast link training without initialization.

In a possible implementation, the cable information includes a rate supported by the cable, the device information of the first device includes a rate supported by the first device, and the device information of the second device includes a rate supported by the second device. Performing link training between the first device 31 and the second device 32 based on the device information of the first device 31, the cable information, and the device information of the second device 32 includes: determining a target training rate based on the device information of the first device 31, the cable information, and the device information of the second device 32; and performing first link training between the first device 31 and the second device 32 based on the target training rate.

Specifically, after obtaining the device information of the first device 31, the cable information of the cable 33, and the device information of the second device 32, either of the first device 31 and the second device 32 obtains the maximum working rate supported by the first device 31 from the device information of the first device 31, obtains the maximum working rate supported by the second device 32 from the device information of the second device 32, and obtains the maximum working rate supported by the cable 33 from the cable information of the cable 33; and determines a target working rate based on the maximum working rate supported by the first device 31, the maximum working rate supported by the second device 32, and the maximum working rate supported by the cable 33. In addition, when the target rate is determined, in addition to the maximum working rate supported by the first device 31, the maximum working rate supported by the second device 32, and the maximum working rate supported by the cable 33, the target rate may be determined with reference to a service requirement of the communication system. To enable the link training to be performed normally, the determined target rate is an intersection of the maximum working rate supported by the first device 31, the maximum working rate supported by the second device 32, and the maximum working rate supported by the cable 33. In other words, the target rate needs to be less than any one of the maximum working rate supported by the first device 31, the maximum working rate supported by the second device 32, and the maximum working rate supported by the cable 33. In addition, to implement the fast link training, the target rate may be set to a smallest one of the maximum working rate supported by the first device 31, the maximum working rate supported by the second device 32, and the maximum working rate supported by the cable 33.

In this embodiment of the present disclosure, a target rate of the communication system may be determined based on the device information of the first device 31, the cable information, and the device information of the second device 32, to implement the fast link training at the target rate. In addition, the target rate may be the maximum working rate supported by the communication system. For example, the maximum working rate supported by the communication system is determined based on the device information of the first device 31, the cable information, and the device information of the second device 32, to implement the fast link training at the maximum working rate supported by the communication system, so that link training time can also be greatly reduced even under a link limit.

In a possible implementation, the first device 31 and/or the second device 32 are/is further configured to: detect, if any one of the device information of the first device 31, the cable information, or the device information of the second device 32 is not obtained, whether a link component is removed or powered off after previous link training succeeds, where the link component includes the first device 31, the second device 32, or the cable 33; determine the target training rate based on a training result of the previous link training if the link component is not removed or powered off after the previous link training succeeds; and perform second link training between the first device 31 and the second device 32 if the link component is removed or powered off after the previous link training succeeds, where a training rate of the second link training is a preset rate. The preset rate is a prestored low rate, and the preset rate may be a lowest rate.

It should be understood that if any one of the first device 31, the second device 32, and the cable 33 is removed or powered off, it indicates that the first device 31 is disconnected from the second device 32. When the first device 31 does not obtain any one of the device information of the first device 31, the cable information of the cable 33, and the device information of the second device 32, the first device 31 detects whether the first device 31 is removed or powered off after the previous link training succeeds. However, because the second device 32 or the cable 33 is removed or powered off, it indirectly indicates that the first device 31 is also removed or powered off. Therefore, that the first device 31 detects whether the first device 31 is removed or powered off is equivalent to detecting whether the second device 32 or the cable 33 is removed or powered off. Similarly, when the second device 32 does not obtain any one of the device information of the first device 31, the cable information of the cable 33, and the device information of the second device 32, the second device 32 detects whether the second device 32 is removed or powered off after the previous link training succeeds. However, because the first device 31 or the cable 33 is removed or powered off, it indirectly indicates that the second device 32 is also removed or powered off. Therefore, that the second device 32 detects whether the second device 32 is removed or powered off is equivalent to detecting whether the first device 31 or the cable 33 is removed or powered off.

If either of the first device 31 and the second device 32 detects that the first device 31, the second device 32, or the cable 33 is not removed or powered off after the previous link training succeeds, it indicates that after the previous link training succeeds, the link component of the system has not been replaced, that is, the previous link training is also the link training between the first device 31 and the second device 32. Therefore, the fast link training can be performed based on a result of the previous link training, that is, the first link training is performed based on the result of the previous link training. If either of the first device 31 and the second device 32 detects that the first device 31, the second device 32, or the cable 33 has been removed or powered off after the previous link training succeeds, the link component may have been replaced, for example, the cable 33 may have been replaced. However, because the cable information of the cable 33 is not obtained, the target rate cannot be determined, and the equalization parameter of the system cannot be predicted. Therefore, the link training can be performed only at a low rate, that is, the second link training is performed. For example, a rate of the second link training is a lowest rate.

In this embodiment of the present disclosure, when any one of the device information of the first device 31, the cable information, and the device information of the second device 32 is not obtained, it is detected whether the first device 31, the second device 32, or the cable 33 is removed or powered off after the previous link training succeeds. If the first device 31, the second device 32, or the cable 33 is not removed or powered off after the previous link training succeeds, it indicates that a result of the previous link training is still valid, and a target rate of current link training may be determined based on the training result of the previous link training, so that the fast link training at the target rate is implemented. For example, the maximum working rate supported by the communication system is determined based on the training result of the previous link training, and the fast link training is performed at the maximum working rate supported by the communication system. In addition, if the first device 31, the second device 32, or the cable 33 is removed or powered off after the previous link training succeeds, the target rate cannot be determined because the device information of the first device 31, the cable information, or the device information of the second device 32 is not obtained. As a result, the fast link training at the target rate cannot be implemented, and the link training is performed at a low rate, for example, the link training is performed at a lowest rate, to ensure that a training result of the link training is obtained.

In a possible implementation, the performing first link training between the first device 31 and the second device 32 based on the target training rate includes: searching an equalization parameter retrieval table based on the target training rate, to obtain a first sending equalization parameter value and a first receiving equalization parameter value, where the equalization parameter retrieval table records a training result of link training; and performing training interaction between the first device 31 and the second device 32 based on the first sending equalization parameter value and the first receiving equalization parameter value, to obtain a training result of the first link training.

The equalization parameter retrieval table records the training result of the link training, that is, the equalization parameter retrieval table records an equalization parameter value obtained through training, where the equalization parameter value is a specific value of an equalization parameter, and the equalization parameter is a parameter that needs to be configured by an equalizer.

The first device 31 stores the equalization parameter retrieval table. For example, the equalization parameter retrieval table stored in the first device 31 is stored in the first memory 311. The second device 32 also stores the equalization parameter retrieval table. For example, the equalization parameter retrieval table stored in the second device 32 is stored in the second memory 321. For training results of link training at all rates supported by the system, both the first device 31 and the second device 32 record the training results in the equalization parameter retrieval table.

In an example, the training result of the link training includes: a cable identification code of the cable 33; a rate supported by the communication system, a lane corresponding to each rate, a first equalization parameter value corresponding to each lane, and a reserved parameter when the first device 31 is a transmit end and the second device 32 is a receive end; and a rate supported by the communication system, a quantity of lanes corresponding to each rate, a first equalization parameter value corresponding to each lane, and a reserved parameter when the first device 31 is the receive end and the second device 32 is the transmit end, where the first equalization parameter value is obtained through the link training, and the first equalization parameter value includes the first sending equalization parameter value and the first receiving equalization parameter value.

For example, the training result of the link training includes: information such as the device information of the first device 31 (which mainly describes the first device 31 as the transmit end or the receive end), the device information of the second device 32 (which mainly describes the second device 32 as the transmit end or the receive end), the cable information of the cable 33, a supported rate, a quantity of lanes supported at each rate, an equalization parameter, and a reserved parameter (Reserved). The equalization parameter includes an equalization parameter value of the FFE, an equalization parameter value of the CTLE, and an equalization parameter value of the DFE. These equalization parameters are used to compensate for a loss during signal transmission. Specifically, the equalization parameter retrieval table is shown in Table 4.

TABLE 4

Equalization parameter retrieval table
Equalization parameter retrieval table

| Device information of the first device 31 | Device information of the second device 32 | Cable information of the cable 33 | Rate (Rate) | Quantity of lanes (Lane) | FFE | CTLE | DFE | Reserved1 | Reserved2 |
|---|---|---|---|---|---|---|---|---|---|
| The first device 31 is a transmit end | The second device 32 is a receive end | Cable_x | 2 Gbps | ... | xxx | xxx | xxx | | |
| | | | ... | ... | xxx | xxx | xxx | | |
| | | | 16 Gbps | Lane0 | xxx | xxx | xxx | | |
| | | | | Lane1 | xxx | xxx | xxx | | |
| | | | | Lane2 | xxx | xxx | xxx | | |
| | | | | Lane3 | xxx | xxx | xxx | | |
| | | | | Lane4 | xxx | xxx | xxx | | |
| | | | | Lane5 | xxx | xxx | xxx | | |
| | | | | Lane6 | xxx | xxx | xxx | | |
| | | | | Lane7 | xxx | xxx | xxx | | |
| | | | 24 Gbps | ... | xxx | xxx | xxx | | |
| | | | 32 Gbps | ... | xxx | xxx | xxx | | |
| | | | ... | | | | | | |
| The first device 31 is the receive end | The second device 32 is the transmit end | | 2 Gbps | ... | xxx | xxx | xxx | | |
| | | | ... | ... | xxx | xxx | xxx | | |
| | | | 16 Gbps | Lane0 | xxx | xxx | xxx | | |
| | | | | Lane1 | xxx | xxx | xxx | | |
| | | | | Lane2 | xxx | xxx | xxx | | |
| | | | | Lane3 | xxx | xxx | xxx | | |
| | | | | Lane4 | xxx | xxx | xxx | | |
| | | | | Lane5 | xxx | xxx | xxx | | |
| | | | | Lane6 | xxx | xxx | xxx | | |
| | | | | Lane7 | xxx | xxx | xxx | | |

TABLE 4-continued

Equalization parameter retrieval table
Equalization parameter retrieval table

| Device information of the first device 31 | Device information of the second device 32 | Cable information of the cable 33 | Rate (Rate) | Quantity of lanes (Lane) | FFE | CTLE | DFE | Reserved1 | Reserved2 |
|---|---|---|---|---|---|---|---|---|---|
| | | | 24 Gbps | ... | xxx | xxx | xxx | | |
| | | | 32 Gbps | ... | xxx | xxx | xxx | | |
| | | | ... | ... | ... | ... | ... | | |

"Cable_x" in Table 4 is a 32-bit cable identifier (product ID), that is, the cable identification code. "xxx" in Table 4 indicates a specific parameter value. Table 4 shows an example in which all parameters exist, that is, all the parameters have corresponding parameter values. Table 4 may alternatively be empty, that is, all the parameters have no corresponding parameter values. In this case, it indicates that the first link training is not performed.

In this example, the equalization parameter retrieval table records the rate supported by the communication system, the lane corresponding to each rate, and the first equalization parameter value corresponding to each lane when the first device 31 is the transmit end and the second device 31 is the receive end, or when the first device 31 is the receive end and the second device 32 is the transmit end. Therefore, for any case that the first device 31 is the transmit end and the second device 32 is the receive end, or the first device 31 is the receive end and the second device 32 is the transmit end, and for link training on any lane between the first device 31 and the second device 32, both the first device 31 and the second device 32 can quickly search the equalization parameter retrieval table for a first equalization parameter based on the target rate.

Specifically, when link training needs to be performed at a target rate, both the first device 31 and the second device 32 search, based on the target rate, the equalization parameter retrieval table stored in the first device 31 and the second device 32, to obtain a first sending equalization parameter value and a first receiving equalization parameter value that correspond to the target rate. Then, the first device 31 and the second device 32 configure the first sending equalization parameter value or the first receiving equalization parameter value. When the first device 31 is the transmit end and the second device 32 is the receive end, the first device 31 configures the first sending equalization parameter value, and the second device 32 configures the first receiving equalization parameter value. When the second device 32 is the transmit end and the first device 31 is the receive end, the second device 32 configures the first sending equalization parameter value, and the first device 31 configures the first receiving equalization parameter value. After configuring the first sending equalization parameter value or the first receiving equalization parameter value, the first device 31 and the second device 32 perform training interaction, and obtain a training result of the first link training after equalization convergence. A process of searching the equalization parameter retrieval table includes: first searching a column of "rate" in the equalization parameter retrieval table for whether the target rate exists; then checking whether a row in which the target rate is located has a corresponding equalization parameter value if the target rate exists; and reading the equalization parameter value corresponding to the target rate if the equalization parameter value corresponding to the target rate already exists, that is, obtaining the first sending equalization parameter value and the first receiving equalization parameter value.

In this embodiment of the present disclosure, the first device 31 stores the equalization parameter retrieval table, and the second device 32 also stores the equalization parameter retrieval table. The equalization parameter retrieval table records the training result of the link training, that is, the equalization parameter retrieval table records an equalization parameter value obtained through training. The equalization parameter value is a specific value of an equalization parameter, and the equalization parameter is a parameter that needs to be configured by an equalizer. The first device 31 may search, based on the target training rate, the equalization parameter retrieval table stored in the first device, to obtain the first sending equalization parameter value and the first receiving equalization parameter value. Alternatively, the second device 32 may search, based on the target training rate, the equalization parameter retrieval table stored in the second device, to obtain the first sending equalization parameter value and the first receiving equalization parameter value. After both the first device 31 and the second device 32 obtain the first sending equalization parameter value and the first receiving equalization parameter value, and if the first device 31 is the transmit end and the second device 32 is the receive end, the first device 31 configures the first sending equalization parameter value, and the second device 32 configures the first receiving equalization parameter value; and if the first device 31 is the receive end and the second device 32 is the transmit end, the first device 31 configures the first receiving equalization parameter value, and the second device 32 configures the first sending equalization parameter value. After both the first device 31 and the second device 32 configure the equalization parameter values, the first device 31 and the second device 32 perform training interaction, to obtain the training result of the first link training, so as to implement the fast link training. In addition, because the equalization parameter retrieval table records the training result of the link training, and if the link training has been performed previously based on the target rate, and the first device 31 is not disconnected from the second device 32, the equalization parameter retrieval table records the training result of the link training at the target rate. If the link training needs to be performed based on the target rate again, the first sending equalization parameter value and the first receiving equalization parameter value at the target rate are directly and quickly read and configured in the equalization parameter retrieval table based on the target rate, to implement the fast link training in a specific scenario (that is, at a specific rate), and reduce the link training time.

In a possible implementation, the performing first link training between the first device 31 and the second device 32 based on the target training rate further includes: searching an equalization parameter prediction table based on the target training rate if the first sending equalization parameter value and the first receiving equalization parameter value are not found in the equalization parameter retrieval table, to obtain a second sending equalization parameter value and a second receiving equalization parameter value, where the equalization parameter prediction table records a prediction result of the link training; and performing training interaction between the first device 31 and the second device 32 based on the second sending equalization parameter value and the second receiving equalization parameter value, to obtain the training result of the first link training.

It should be understood that if the first sending equalization parameter value and the first receiving equalization parameter value are not found in the equalization parameter retrieval table based on the target rate, it indicates that there is no result of the link training at the target rate, that is, before the current link training, no link training is performed at the target rate. However, because the equalization parameter prediction table records the prediction result of the link training, the equalization parameter prediction table may be searched based on the target rate to obtain equalization prediction values, that is, obtain the second sending equalization parameter value and the second receiving equalization parameter value. The equalization prediction values are equalization parameter values deduced by obtaining loss information of each component of the link. For example, an equalization parameter value of the FFE, an equalization parameter value of the CTLE, the equalization parameter value of the DFE, and the like in the equalization parameter prediction table are predicted values.

In an example, the prediction result of the link training includes: a cable identification code of the cable 33; a rate supported by the communication system, a lane corresponding to each rate, a second equalization parameter value corresponding to each lane, and a reserved parameter when the first device 31 is the transmit end and the second device 32 is the receive end; and a rate supported by the communication system, a quantity of lanes corresponding to each rate, a second equalization parameter value corresponding to each lane, and a reserved parameter when the first device 31 is the receive end and the second device 32 is the transmit end, where the second equalization parameter value is obtained through prediction based on the device information of the first device 31, the cable information, and the device information of the second device 32, and the second equalization parameter value includes the second sending equalization parameter value and the second receiving equalization parameter value.

Specifically, the equalization parameter prediction table is shown in Table 5.

TABLE 5

| Equalization parameter prediction table | | | | | | | | | |
|---|---|---|---|---|---|---|---|---|---|
| Equalization parameter prediction table | | | | | | | | | |
| Device information of the first device 31 | Device information of the second device 32 | Cable information of the cable 33 | Rate (Rate) | Quantity of lanes (Lane) | FFE | CTLE | DFE | Reserved1 | Reserved2 |
| The first device 31 is a transmit end | The second device 32 is a receive end | Cable_x | 2 Gbps | . . . | xxx | xxx | xxx | | |
| | | | . . . | . . . | xxx | xxx | xxx | | |
| | | | 16 Gbps | Lane0 | xxx | xxx | xxx | | |
| | | | | Lane1 | xxx | xxx | xxx | | |
| | | | | Lane2 | xxx | xxx | xxx | | |
| | | | | Lane3 | xxx | xxx | xxx | | |
| | | | | Lane4 | xxx | xxx | xxx | | |
| | | | | Lane5 | xxx | xxx | xxx | | |
| | | | | Lane6 | xxx | xxx | xxx | | |
| | | | | Lane7 | xxx | xxx | xxx | | |
| | | | 24 Gbps | . . . | xxx | xxx | xxx | | |
| | | | 32 Gbps | . . . | xxx | xxx | xxx | | |
| | | | . . . | . . . | . . . | . . . | . . . | | |
| The first device 31 is a receive end | The second device 32 is a transmit end | | 2 Gbps | . . . | xxx | xxx | xxx | | |
| | | | . . . | . . . | xxx | xxx | xxx | | |
| | | | 16 Gbps | Lane0 | xxx | xxx | xxx | | |
| | | | | Lane1 | xxx | xxx | xxx | | |
| | | | | Lane2 | xxx | xxx | xxx | | |
| | | | | Lane3 | xxx | xxx | xxx | | |
| | | | | Lane4 | xxx | xxx | xxx | | |
| | | | | Lane5 | xxx | xxx | xxx | | |
| | | | | Lane6 | xxx | xxx | xxx | | |
| | | | | Lane7 | xxx | xxx | xxx | | |
| | | | 24 Gbps | . . . | xxx | xxx | xxx | | |
| | | | 32 Gbps | . . . | xxx | xxx | xxx | | |
| | | | . . . | . . . | . . . | . . . | . . . | | |

"xxx" in Table 5 represents a specific parameter value. Table 5 is dynamically updated, that is, parameters and parameter values corresponding to the parameters in Table 5 are dynamically updated, and are dynamically updated based on an actual service requirement of the communication system.

In this example, the equalization parameter prediction table records the rate supported by the communication system, the lane corresponding to each rate, and the second equalization parameter value corresponding to each lane when the first device 31 is the transmit end and the second device 32 is the receive end, or when the first device 31 is the receive end and the second device 32 is the transmit end. Therefore, for any case that the first device 31 is the transmit end and the second device 32 is the receive end, or the first device 31 is the receive end and the second device 32 is the transmit end, and for link training on any lane between the first device 31 and the second device 32, both the first device 31 and the second device 32 can quickly search the equalization parameter prediction table for a second equalization parameter based on the target rate.

A process of searching the equalization parameter prediction table is consistent with the process of searching the equalization parameter retrieval table. A process of configuring the second sending equalization parameter value and the second receiving equalization parameter value and performing training interaction after the second sending equalization parameter value and the second receiving equalization parameter value are configured is consistent with a process of configuring the first sending equalization parameter value and the first receiving equalization parameter value and performing training interaction after the first sending equalization parameter value and the first receiving equalization parameter value are configured. Details are not described herein again.

In this embodiment of the present disclosure, the first device 31 stores the equalization parameter prediction table, and the second device 32 also stores the equalization parameter prediction table. The equalization parameter prediction table records the prediction result of the link training, and the prediction result may include an equalization parameter that is derived or predicted based on loss information of each link component. When the first sending equalization parameter value and the first receiving equalization parameter value are not found in the equalization parameter retrieval table, the first device 31 may search, based on the target training rate, the equalization parameter prediction table stored in the first device, to obtain the second sending equalization parameter value and the second receiving equalization parameter value. Alternatively, the second device 32 may search, based on the target training rate, the equalization parameter prediction table stored in the second device, to obtain the second sending equalization parameter value and the second receiving equalization parameter value. After both the first device 31 and the second device 32 obtain the second sending equalization parameter value and the second receiving equalization parameter value, and if the first device 31 is the transmit end and the second device 32 is the receive end, the first device 31 configures the second sending equalization parameter value, and the second device 32 configures the second receiving equalization parameter value; and if the first device 31 is the receive end and the second device 32 is the transmit end, the first device 31 configures the second receiving equalization parameter value, and the second device 32 configures the second sending equalization parameter value. After both the first device 31 and the second device 32 configure the equalization parameter values, the first device 31 and the second device 32 perform training interaction, to obtain the training result of the first link training, so as to implement the fast link training. The equalization parameter prediction table records the prediction result of the link training, that is, records a predicted equalization parameter. Because the equalization parameter can be predicted, it is not necessary to complete link training and save related data before delivery of a device. A user can perform free networking on different devices as required, and can perform fast link training after the networking.

In a possible implementation, the first device 31 and/or the second device 32 are/is further configured to: obtain the prediction result of the link training through prediction based on the device information of the first device 31, the cable information, and the device information of the second device 32, and record the prediction result of the link training in the equalization parameter prediction table.

In this embodiment of the present disclosure, after obtaining the device information of the first device 31, the cable information, and the device information of the second device 32, the first device 31 obtains the prediction result of the link training through prediction based on the device information of the first device 31, the cable information, and the device information of the second device 32, and records the prediction result of the link training in the equalization parameter prediction table. After obtaining the device information of the first device 31, the cable information, and the device information of the second device 32, the second device 32 also obtains the prediction result of the link training through prediction based on the device information of the first device 31, the cable information, and the device information of the second device 32, and records the prediction result of the link training in the equalization parameter prediction table. Therefore, it is helpful for the first device 31 and the second device 32 to quickly find the second sending equalization parameter and the second receiving equalization parameter in the equalization parameter prediction table based on the target rate.

In a possible implementation, the training interaction includes: S1: configuring a target sending equalization parameter value, and sending a preset code type to the receive end; S2: configuring a target receiving equalization parameter value, and detecting whether the preset code type is received from the transmit end; S3: roughly adjusting, if the preset code type is not received from the transmit end, the receiving equalization parameter value configured by the receive end until the preset code type is received from the transmit end; S4: finely adjusting, if the preset code type is received from the transmit end, the receiving equalization parameter value configured by the receive end, to obtain the training result of the first link training; S5: sending the training result of the first link training to the transmit end; and S6: receiving the training result of the first link training from the receive end, where if the target sending equalization parameter value is the first sending equalization parameter value, the target receiving equalization parameter value is the first receiving equalization parameter value; and if the target sending equalization parameter value is the second sending equalization parameter value, the target receiving equalization parameter value is the second receiving equalization parameter value; the preset code type is a code type used for training interaction; if the first device 31 is the transmit end and the second device 32 is the receive end, the first device 31 performs step S1 and step S6, and the second device 32 performs step S2 to step S5; and if the second device 32 is the transmit end and the first device 31 is the receive end, the second device 32 performs step S1 and step S6, and the first device 31 performs step S2 to step S5.

During training interaction, the transmit end sends a specific code type used for training interaction to the receive end, and the receive end detects whether the specific code type exists, that is, the receive end detects whether the specific code type is received. If the receive end detects the specific code type, the code type detection succeeds. If the receive end does not detect the specific code type, the code type detection fails. It should be understood that, in line transmission such as a cable or an optical fiber, an electrical pulse waveform suitable for lane transmission needs to be selected to represent (or carry) a digital message code. Generally, a form in which an electrical pulse exists is referred to as a (line) code type.

It should be noted that, in this embodiment of the present disclosure, during training interaction, the sending equalization parameter value configured by the transmit end remains unchanged, and the receiving equalization parameter value configured by the receive end needs to be adjusted. In this case, after the link training converges, the receive end knows that the sending equalization parameter value configured by the peer end after training convergence is the target sending equalization parameter value, and the receiving equalization parameter value configured by the receive end is a finely adjusted receiving equalization parameter value. The transmit end only knows that the sending equalization parameter value configured by the transmit end is the target sending equalization parameter value, and does not know the receiving equalization parameter value configured by the peer end, that is, does not know the receiving equalization parameter value finely adjusted by the peer end. Therefore, to enable the transmit end to know the receiving equalization parameter value configured by the receive end after training convergence, the receive end further exchanges information with the transmit end through a low-speed lane, notifies the transmit end that training has converged, and notifies the transmit end of the receiving equalization parameter value after training convergence, that is, notifies the transmit end of the finely adjusted receiving equalization parameter value. Specifically, the receive end sends the training result of the first link training to the transmit end, or sends the receiving equalization parameter value after training convergence to the transmit end.

Specifically, if the first device 31 is the transmit end and the second device 32 is the receive end, the first device 31 configures the target sending equalization parameter value, and the second device 32 configures the target receiving equalization parameter value. The first device 31 sends, to the second device 32, a specific code type used for training interaction. The second device 32 detects the code type transmitted by the first device 31 to the second device 32. When the code type detection fails, that is, when the second device 32 does not detect the specific code type, the second device 32 roughly adjusts the receiving equalization parameter value configured by the second device 32 until the code type detection succeeds. When the code type detection succeeds, that is, when the second device 32 detects the specific code type, the second device 32 finely adjusts the receiving equalization parameter value configured by the second device 32, to obtain the training result of the first link training. Then, the second device 32 sends the training result of the first link training to the first device 31. The first device 31 receives the training result of the first link training from the second device 32. Alternatively, if the second device 32 is the transmit end and the first device 31 is the receive end, the second device 32 configures the target sending equalization parameter value, and the first device 31 configures the target receiving equalization parameter value. The second device 32 sends, to the first device 31, a specific code type used for training interaction. The first device 31 detects the code type transmitted by the second device 32 to the first device 31. When the code type detection fails, that is, when the first device 31 does not detect the specific code type, the first device 31 roughly adjusts the receiving equalization parameter value configured by the first device 31 until the code type detection succeeds. When the code type detection succeeds, that is, when the first device 31 detects the specific code type, the first device 31 finely adjusts the receiving equalization parameter value configured by the first device 31, to obtain the training result of the first link training. Then, the first device 31 sends the training result of the first link training to the second device 32. The second device 32 receives the training result of the first link training from the first device 31.

It should be understood that the rough adjustment refers to large adjustment, and the fine adjustment refers to small adjustment. For example, a step size of the rough adjustment is greater than a step size of the fine adjustment. Specifically, the receive end can receive the preset code type from the transmit end only when the receiving equalization parameter value configured by the receive end falls within a range. If the receive end cannot receive the preset code type, it indicates that the receiving equalization value currently configured by the receive end is not within the range, and the large adjustment is required, so that the receiving equalization value currently configured by the receive end is within the range, so that the receive end can receive the preset code type. If the receive end can receive the preset code type, it indicates that the receive equalization value currently configured by the receive end falls within the range. To achieve equalization convergence, that is, to obtain an optimal receiving equalization value, the small adjustment is performed, so as to obtain the training result of the first link training. In addition, in existing link training, in a training interaction process, a sending equalization parameter value configured by the transmit end needs to be adjusted, and a receiving equalization parameter value configured by the receive end also needs to be adjusted, to obtain the training result of the link training.

In this embodiment of the present disclosure, in the training interaction process, the sending equalization parameter value of the transmit end remains unchanged, and the training result of the link training can be obtained only by adjusting the receiving equalization parameter value of the receive end. Therefore, in this embodiment of the present disclosure, the training interaction process consumes less time, so that the overall time consumed by the link training is small.

In a possible implementation, if the first link training fails, the first device 31 and/or the second device 32 are/is further configured to: perform second link training between the first device 31 and the second device 32 at the preset rate.

It should be understood that if no training result is obtained through the first link training or the training result obtained through the first link training is incorrect, it indicates that the first link training fails. In this case, to determine that a result of the link training between the first device 31 and the second device 32 can be obtained, the second link training between the first device 31 and the second device 32 is performed.

In this embodiment of the present disclosure, if no training result is obtained in the first link training, that is, no training result is obtained in the fast link training at a higher rate, the second link training is performed, that is, the link training is performed at a lower rate, for example, the link training is performed at a lowest rate. Therefore, it can be ensured that the training result of the link training is obtained.

In a possible implementation, after obtaining the training result of the first link training or obtaining a training result of the second link training, the first device 31 and/or the second device 32 are/is further configured to: update the equalization parameter retrieval table based on the training result of the first link training or the training result of the second link training.

Specifically, the first device 31 updates, based on the training result of the first link training or the training result of the second link training, the equalization parameter retrieval table stored in the first memory 311. The second device 32 updates, based on the training result of the first link training or the training result of the second link training, the equalization parameter retrieval table stored in the second memory 321. The updated equalization parameter retrieval table is shown in Table 6.

table may also be updated based on the training result of the second link training, that is, an equalization parameter and the like in the training result of the second link training are recorded at a position corresponding to the lower rate in the equalization parameter retrieval table. If the link training still needs to be performed at the lower rate subsequently, the equalization parameter corresponding to the lower rate can be directly found in the equalization parameter retrieval table. For example, an equalization parameter obtained by performing link training at the lowest rate is recorded in the equalization parameter retrieval table, and when the link training needs to be performed at the lowest rate subsequently, the equalization parameter at the lowest rate can be quickly obtained, thereby improving the link training speed, and implementing the fast link training.

TABLE 6

Updated equalization parameter retrieval table
Updated equalization parameter retrieval table

| Device information of the first device 31 | Device information of the second device 32 | Cable information of the cable 33 | Rate (Rate) | Quantity (Lane) of lanes | FFE | CTLE | DFE | Reserved1 | Reserved2 |
|---|---|---|---|---|---|---|---|---|---|
| Current communication system (Only an equalization parameter after the system establish a like recently.) | | | 2 Gbps | ... | xxx | xxx | xxx | | |
| | | | ... | ... | xxx | xxx | xxx | | |
| | | | 16 Gbps | Lane0 | xxx | xxx | xxx | | |
| | | | | Lane1 | xxx | xxx | xxx | | |
| | | | | Lane2 | xxx | xxx | xxx | | |
| | | | | Lane3 | xxx | xxx | xxx | | |
| | | | | Lane4 | xxx | xxx | xxx | | |
| | | | | Lane5 | xxx | xxx | xxx | | |
| | | | | Lane6 | xxx | xxx | xxx | | |
| | | | | Lane7 | xxx | xxx | xxx | | |
| | | | 24 Gbps | ... | xxx | xxx | xxx | | |
| | | | 32 Gbps | ... | xxx | xxx | xxx | | |
| | | | ... | ... | ... | ... | ... | | |
| | | | 2 Gbps | ... | xxx | xxx | xxx | | |
| | | | ... | ... | xxx | xxx | xxx | | |
| | | | 16 Gbps | Lane0 | xxx | xxx | xxx | | |
| | | | | Lane1 | xxx | xxx | xxx | | |
| | | | | Lane2 | xxx | xxx | xxx | | |
| | | | | Lane3 | xxx | xxx | xxx | | |
| | | | | Lane4 | xxx | xxx | xxx | | |
| | | | | Lane5 | xxx | xxx | xxx | | |
| | | | | Lane6 | xxx | xxx | xxx | | |
| | | | | Lane7 | xxx | xxx | xxx | | |
| | | | 24 Gbps | ... | xxx | xxx | xxx | | |
| | | | 32 Gbps | ... | xxx | xxx | xxx | | |
| | | | ... | ... | ... | ... | ... | | |

"xxx" in Table 6 represents a specific parameter value.

In this embodiment of the present disclosure, if the first link training performed at the target rate succeeds, the equalization parameter retrieval table is updated based on the training result of the first link training, that is, an equalization parameter and the like in the training result of the first link training are recorded at a position corresponding to the target rate in the equalization parameter retrieval table. If the link training still needs to be performed at the target rate subsequently, the equalization parameter corresponding to the target rate can be directly found in the equalization parameter retrieval table, thereby improving a link training speed and implementing the fast link training. In addition, if the second link training performed at the lower rate succeeds, the equalization parameter retrieval It should be noted that there may be a plurality of lanes between the first device 31 and the second device 32, that is, the cable 33 includes a plurality of lanes for data transmission between the first device 31 and the second device 32. The foregoing link training between the first device 31 and the second device 32 is only link training on one of the plurality of lanes between the first device 31 and the second device 32. For example, there are eight lanes or four lanes between the first device 31 and the second device 32. When there are eight lanes, there are six specific scenarios: The first device 31 is the transmit end of the eight lanes, and the second device 32 is the receive end of the eight lanes; the first device 31 is the transmit end of the six lanes and the receive end of the two lanes, and the second device 32 is the transmit end of the two lanes and the receive end of the six lanes; the first device 31 is the transmit end of the four lanes and the receive end of the four lanes, and the second device 32 is the transmit end of the four lanes and the receive end of the four lanes; the second device 32 is the transmit end of the eight lanes, and the first device 31 is the receive end of the eight lanes; the second device 32 is the transmit end of the six lanes and the receive end of the two lanes, and the first device 31 is the transmit end of the two lanes and the receive end of the six lanes; and the second device 32 is the transmit end of the four lanes and the receive end of the four lanes, and the first device 31 is the transmit end of the four lanes and the receive end of the four lanes. When there are four lanes, there are also six specific scenarios: The first device 31 is the transmit end of the four lanes, and the second device 32 is the receive end of the four lanes; the first device 31 is the transmit end of the three lanes and the receive end of the one lane, and the second device 32 is the transmit end of the one lane and the receive end of the three lanes; the first device 31 is the transmit end of the two lanes and the receive end of the two lanes, and the second device 32 is the transmit end of the two lanes and the receive end of the two lanes; the second device 32 is the transmit end of the four lanes, and the first device 31 is the receive end of the four lanes; the second device 32 is the transmit end of the three lanes and the receive end of the one lane, and the first device 31 is the transmit end of the one lane and the receive end of the three lanes; and the second device 32 is the transmit end of the two lanes and the receive end of the two lanes, and the first device 31 is the transmit end of the two lanes and the receive end of the two lanes. It should be understood that a quantity of lanes between the first device 31 and the second device 32 is not specifically limited in embodiments of the present disclosure. The foregoing is merely an example for description.

Figure 4:
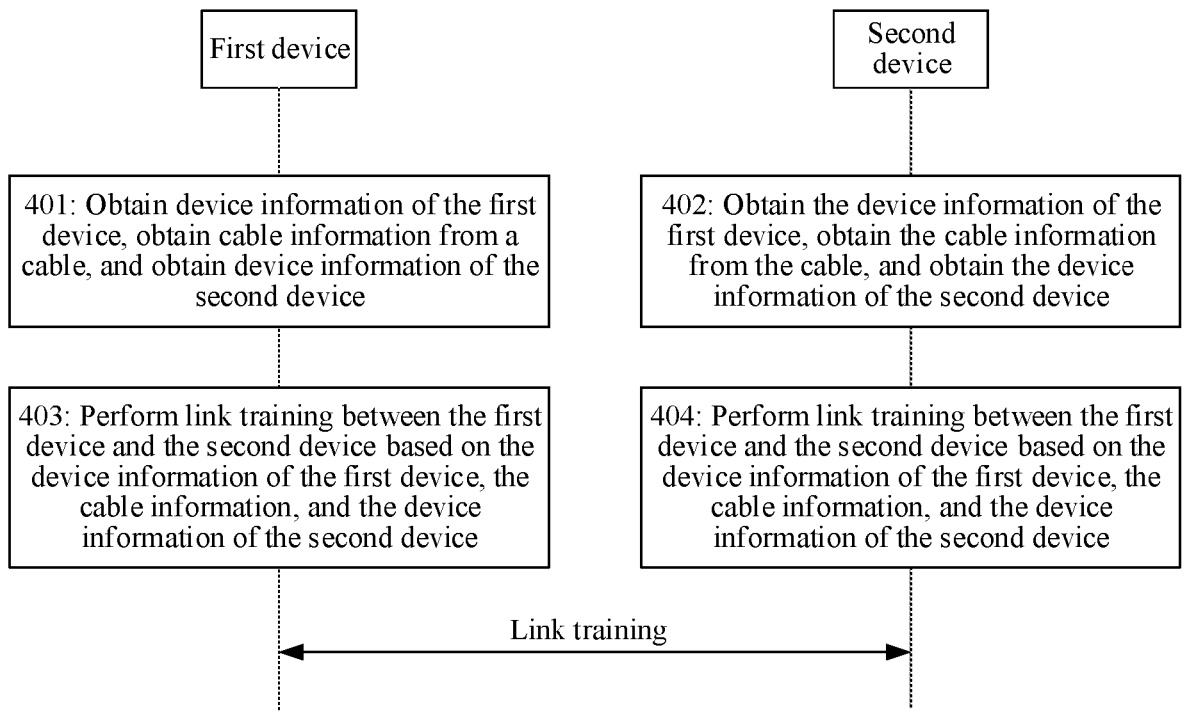
FIG. 4 is a schematic flowchart of a link training method according to an embodiment of the present disclosure.

FIG. 4 is a schematic flowchart of a link training method according to an embodiment of the present disclosure. The method is applied to a communication system. The communication system includes a first device, a second device, and a cable that connects the first device and the second device. The cable stores cable information of the cable. The cable information represents a cable capability. The method may be applied to the communication system shown in FIG. 3. The method includes, but not limited to, the following steps.

Step 401: The first device obtains device information of the first device, obtains the cable information from the cable, and obtains device information of the second device, where the device information represents a device capability.

Step 402: The second device obtains the device information of the first device, obtains the cable information from the cable, and obtains the device information of the second device.

Step 403: The first device performs link training between the first device and the second device based on the device information of the first device, the cable information, and the device information of the second device.

Step 404: The second device performs link training between the first device and the second device based on the device information of the first device, the cable information, and the device information of the second device.

In a possible implementation, the cable information includes a rate supported by the cable, the device information of the first device includes a rate supported by the first device, and the device information of the second device includes a rate supported by the second device. Performing link training between the first device and the second device based on the device information of the first device, the cable information, and the device information of the second device includes: determining a target training rate based on the device information of the first device, the cable information, and the device information of the second device; and performing first link training between the first device and the second device based on the target training rate.

In a possible implementation, the method further includes: detecting, if any one of the device information of the first device, the cable information, or the device information of the second device is not obtained, whether a link component is removed or powered off after previous link training succeeds, where the link component includes the first device, the second device, or the cable; determining the target training rate based on a training result of the previous link training if the link component is not removed or powered off after the previous link training succeeds; and performing second link training between the first device and the second device if the link component is removed or powered off after the previous link training succeeds, where a training rate of the second link training is a preset rate.

In a possible implementation, the performing first link training between the first device and the second device based on the target training rate includes: searching an equalization parameter retrieval table based on the target training rate, to obtain a first sending equalization parameter value and a first receiving equalization parameter value, where the equalization parameter retrieval table records a training result of link training; and performing training interaction between the first device and the second device based on the first sending equalization parameter value and the first receiving equalization parameter value, to obtain a training result of the first link training.

In a possible implementation, the training result of the link training includes: a cable identification code of the cable; a rate supported by the communication system, a lane corresponding to each rate, a first equalization parameter value corresponding to each lane, and a reserved parameter when the first device is a transmit end and the second device is a receive end; or a rate supported by the communication system, a quantity of lanes corresponding to each rate, a first equalization parameter value corresponding to each lane, and a reserved parameter when the first device is the receive end and the second device is the transmit end, where the first equalization parameter value is obtained through the link training, and the first equalization parameter value includes the first sending equalization parameter value and the first receiving equalization parameter value.

In a possible implementation, the method further includes: searching an equalization parameter prediction table based on the target training rate if the first sending equalization parameter value and the first receiving equalization parameter value are not found in the equalization parameter retrieval table, to obtain a second sending equalization parameter value and a second receiving equalization parameter value, where the equalization parameter prediction table records a prediction result of the link training; and performing training interaction between the first device and the second device based on the second sending equalization parameter value and the second receiving equalization parameter value, to obtain the training result of the first link training.

In a possible implementation, the method further includes: The first device obtains the prediction result of the link training through prediction based on the device information of the first device, the cable information, and the device information of the second device, and records the prediction result of the link training in the equalization parameter prediction table; and the second device obtains the prediction result of the link training through prediction based on the device information of the first device, the cable information, and the device information of the second device, and records the prediction result of the link training in the equalization parameter prediction table.

In a possible implementation, the prediction result of the link training includes: a cable identification code of the cable; a rate supported by the communication system, a lane corresponding to each rate, a second equalization parameter value corresponding to each lane, and a reserved parameter when the first device is the transmit end and the second device is the receive end; or a rate supported by the communication system, a quantity of lanes corresponding to each rate, a second equalization parameter value corresponding to each lane, and a reserved parameter when the first device is the receive end and the second device is the transmit end, where the second equalization parameter value is obtained through prediction based on the device information of the first device, the cable information, and the device information of the second device, and the second equalization parameter value includes the second sending equalization parameter value and the second receiving equalization parameter value.

In a possible implementation, if the electronic apparatus is a transmit end, the training interaction includes: configuring a target sending equalization parameter value, and sending a preset code type to a receive end, where the receive end configures a target receiving equalization parameter value; and receiving the training result of the first link training from the receive end; or if the electronic apparatus is the receive end, the training interaction includes: configuring the target receiving equalization parameter value, and detecting whether the preset code type is received from the transmit end, where the transmit end configures the target sending equalization parameter value; roughly adjusting, if the preset code type is not received from the transmit end, the configured receiving equalization parameter value until the preset code type from the transmit end is detected; and finely adjusting, if the preset code type is received from the transmit end, the configured receiving equalization parameter value, to obtain the training result of the first link training, where if the transmit end is the first device, the receive end is the second device, and if the transmit end is the second device, the receive end is the first device; if the target sending equalization parameter value is the first sending equalization parameter value, the target receiving equalization parameter value is the first receiving equalization parameter value, and if the target sending equalization parameter value is the second sending equalization parameter value, the target receiving equalization parameter value is the second receiving equalization parameter value; and the preset code type is a code type used for training interaction.

In a possible implementation, if the first link training fails, the method further includes: performing second link training between the first device and the second device at the preset rate.

In a possible implementation, after the training result of the first link training is obtained or a training result of the second link training is obtained, the method further includes: updating the equalization parameter retrieval table based on the training result of the first link training or the training result of the second link training.

It should be noted that for a specific process of the link training method described in this embodiment of the present disclosure, refer to the related description in the foregoing embodiment shown in FIG. 3. Details are not described herein again.

In the link training method described in FIG. 4, the first device stores the device information of the first device, the second device stores the device information of the second device, the first device and the second device are connected through the cable, and the cable stores the cable information of the cable; during link training, the first device obtains the device information of the first device that is stored in the first device, obtains the cable information from the cable, and obtains the device information of the second device from the second device; the second device obtains the device information of the second device that is stored in the second device, obtains the cable information from the cable, and obtains the device information of the first device from the first device; and after obtaining the device information of the first device, the cable information, and the device information of the second device, both the first device and the second device may perform link training between the first device and the second device based on the device information of the first device, the cable information, and the device information of the second device. For example, both the first device and the second device may determine, based on the device information of the first device, the cable information, and the device information of the second device, a maximum working rate supported by the communication system, and perform fast link training between the first device and the second device at the maximum working rate. It can be learned that because the first device stores the device information of the first device, the second device stores the device information of the second device, and the cable stores the cable information of the cable, after any one or more link components of the first device, the second device, and the cable are replaced, and when the link training is performed again, the first device and the second device can further quickly obtain the device information of the first device, the cable information, and the device information of the second device. Therefore, the communication system can still implement fast link training without initialization.

Figure 5:
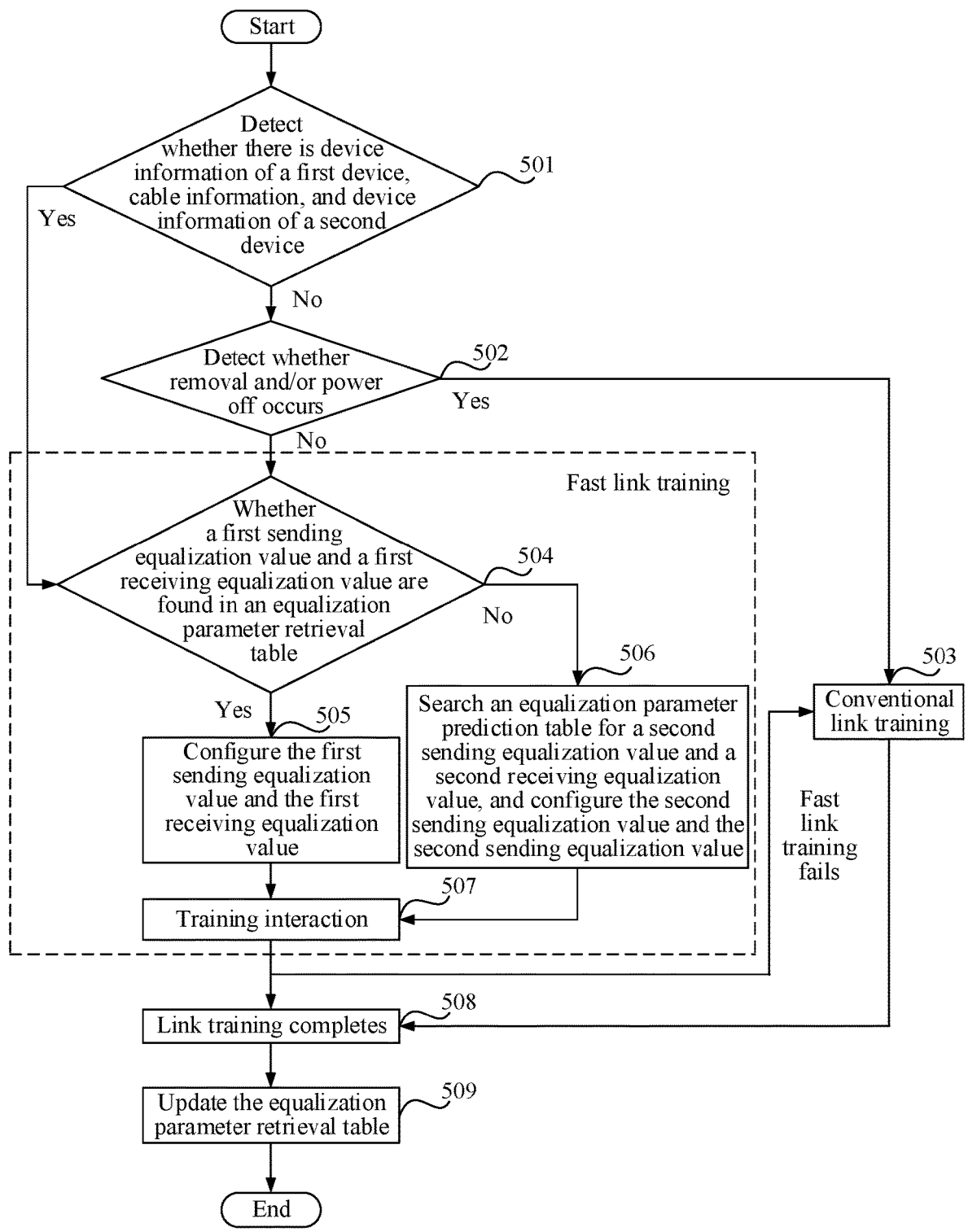
FIG. 5 is a schematic flowchart of another link training method according to an embodiment of the present disclosure.

FIG. 5 is a schematic flowchart of another link training method according to an embodiment of the present disclosure. The method is applied to a communication system. The communication system includes a first device, a second device, and a cable that connects the first device and the second device. The cable stores cable information of the cable. The cable information represents a cable capability. The method may be applied to the communication system shown in FIG. 3. The method includes, but not limited to, the following steps.

Step 501: Detect whether there is device information of the first device, the cable information, and device information of the second device, where the device information represents a device capability.

Before link training starts, and after the communication system starts, the first device and the second device separately detect whether the cable is inserted, that is, both the first device and the second device separately detect whether the cable is connected to the first device and the second device. If a result of the detection is no, it indicates that the cable is not inserted into the first device or the second device, and the first device or the second device keeps detecting whether the cable is inserted. If the result of the detection is yes, the first device obtains the cable information of the cable from the cable, and the second device also obtains the cable information of the cable from the cable. Because the first device stores the device information of the first device, and the second device stores the device information of the second device, the first device further obtains the device information of the second device from the second device, and the first device further reads the device information of the first device that is stored in the first device. Similarly, the second device further obtains the device information of the first device from the first device, and the second device further reads the device information of the second device that is stored in the second device. Then, both the first device and the second device detect whether the first device and the second device have the device information of the first device, the cable information, and the device information of the second device, that is, both the first device and the second device detect whether the first device and the second device obtain the device information of the first device, the cable information, and the device information of the second device.

If it is detected that there is no device information of the first device, cable information, and device information of the second device, the system performs step 502. That is, if either of the first device and the second device detects no one of the device information of the first device, the cable information, or the device information of the second device, both the first device and the second device perform step 502. If the device information of the first device, the cable information, and the device information of the second device are detected, the system enters a fast link training (FAST Training, FT) mode. That is, the first device and the second device simultaneously detect three pieces of information: the device information of the first device, the cable information, and the device information of the second device, and both the first device and the second device start performing step 504.

Step 502: Detect whether removal and/or power off occurs.

Specifically, the first device detects whether the first device, the cable, or the second device is removed or powered off after previous link training succeeds, and the second device also detects whether the first device, the cable, or the second device is removed or powered off after the previous link training succeeds. If a result of the detection is yes, the system enters a conventional training mode. In other words, provided that either of the first device and the second device detects that the first device, the cable, or the second device is removed or powered off after the previous link training succeeds, both the first device and the second device perform step 503. If it is detected that the first device, the cable, or the second device is not removed or powered off after the previous link training succeeds, the system enters the fast training mode. In other words, when the first device and the second device simultaneously detect that the first device, the cable, or the second device is not removed or powered off after the previous link training succeeds, both the first device and the second device start performing step 504.

Step 503: Conventional link training.

During conventional training, link training is performed at a lowest rate. After a link is successfully established at the lowest rate, a higher rate is tried based on a rate requirement of the communication system, that is, the higher rate is tried based on a communication rate that is required by the communication system and that is confirmed by a service. The conventional training allows closing operations such as the FFE and the DFE. In addition, time for the fast link training is much less than that for the conventional link training.

Step 504: Check whether a first sending equalization parameter value and a first receiving equalization parameter value are found in an equalization parameter retrieval table.

Specifically, the first device determines, based on the device information of the first device read by the first device, the cable information and the device information of the second device that are obtained by the first device, and a service requirement of the communication system, a communication rate required for link training; matches the communication rate with the equalization parameter retrieval table stored in the first device; and reads the first sending equalization parameter value and the first receiving equalization parameter value in a system state of the communication rate from the equalization parameter retrieval table if the matching succeeds. Similarly, the second device also determines, based on the device information of the second device read by the second device, the cable information and the device information of the first device that are obtained by the second device, and the service requirement of the communication system, the communication rate required for the link training; then matches the communication rate with the equalization parameter retrieval table stored in the second device; and reads the first sending equalization parameter value and the first receiving equalization parameter value in the system state of the communication rate from the equalization parameter retrieval table if the matching succeeds.

Step 505: Configure the first sending equalization parameter value and the first receiving equalization parameter value.

Specifically, after both the first device and the second device obtain the first sending equalization parameter value and the first receiving equalization parameter value, and if the first device is the transmit end and the second device is the receive end, the first device configures the first sending equalization parameter value, and the second device configures the first receiving equalization parameter value; and if the first device is the receive end and the second device is the transmit end, the first device configures the first receiving equalization parameter value, and the second device configures the first sending equalization parameter value.

Step 506: Search an equalization parameter prediction table for a second sending equalization parameter value and a second receiving equalization parameter value, and configure the second sending equalization parameter value and the second sending equalization parameter value.

If the first sending equalization parameter value and the first receiving equalization parameter value are not found in the equalization parameter retrieval table, the second sending equalization parameter value and the second receiving equalization parameter value are found in the equalization parameter prediction table. The second sending equalization parameter value and the second receiving equalization parameter value in the equalization parameter prediction table are predicted values of equalization parameters.

Specifically, the first device reads, based on the determined communication rate, the second sending equalization parameter value and the second receiving equalization parameter value that are in the system state of the communication rate from the equalization parameter prediction table stored in the first device. The second device also reads, based on the determined communication rate, the second sending equalization parameter value and the second receiving equalization parameter value that are in the system state of the communication rate from the equalization parameter prediction table stored in the second device. Specifically, after both the first device and the second device obtain the second sending equalization parameter value and the second receiving equalization parameter value, and if the first device is the transmit end and the second device is the receive end, the first device configures the second sending equalization parameter value, and the second device configures the second receiving equalization parameter value; and if the first device is the receive end and the second device is the transmit end, the first device configures the second receiving equalization parameter value, and the second device configures the second sending equalization parameter value.

Step 507: Training interaction.

Figure 6:
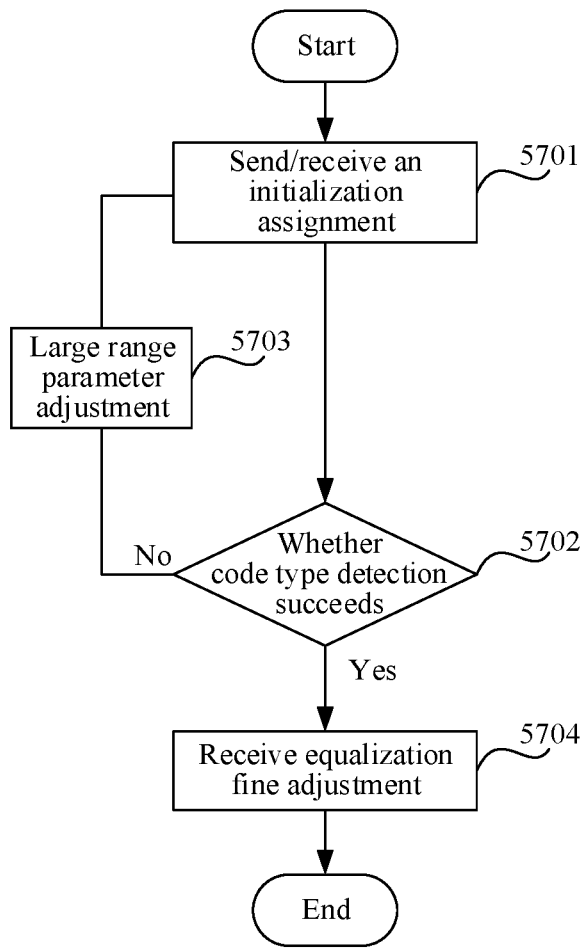
FIG. 6 is a schematic flowchart of training interaction according to an embodiment of the present disclosure.

The training interaction is to ensure precision of the fast link training. A process of training interaction is shown in FIG. 6, and specifically includes the following steps.

Step 5071: Send/receive an initialization assignment.

Both the first device and the second device configure equalization parameter values and device configuration is initialized. Specifically, if the first device is the transmit end and the second device is the receive end, the first device configures a target sending equalization parameter value, and the second device configures a target receiving equalization parameter value. If the first device is the receive end and the second device is the transmit end, the first device configures the target receiving equalization parameter value, and the second device configures the target sending equalization parameter value. If the target sending equalization parameter value is the first sending equalization parameter value, the target receiving equalization parameter value is the first receiving equalization parameter value. If the target sending equalization parameter value is the second sending equalization parameter value, the target receiving equalization parameter value is the second receiving equalization parameter value.

Step 5072: Whether code type detection succeeds.

Specifically, the receive end performs code type detection. If the first device is the transmit end and the second device is the receive end, the second device performs code type detection. If the first device is the receive end and the second device is the transmit end, the first device performs code type detection. If the code type detection fails, step 5073 is performed. If the code type detection succeeds, step 5074 is performed.

Step 5073: Large range parameter adjustment.

Specifically, the receive end performs large range parameter adjustment, that is, the receive end greatly adjusts a receiving equalization parameter value configured by the receive end until the code type detection succeeds. However, the transmit end does not adjust a sending equalization parameter value configured by the transmit end. If the first device is the transmit end, and the second device is the receive end, the second device performs large range parameter adjustment. If the first device is the receive end and the second device is the transmit end, the first device performs large range parameter adjustment.

Step 5074: Receiving equalization fine adjustment.

Specifically, after the code type detection succeeds, the receive end automatically optimizes the corresponding receiving equalization parameter value in a small amplitude, which includes CTLE fine adjustment, DFE convergence, and the like. However, the transmit end still does not adjust the configured sending equalization parameter value. If the first device is the transmit end, and the second device is the receive end, the second device performs receiving equalization fine adjustment. If the first device is the receive end and the second device is the transmit end, the first device performs receiving equalization fine adjustment.

It should be noted that after the training interaction, if no training result is obtained through the fast link training, or a training result obtained through the fast link training is incorrect, the fast link training fails, and step 503 is performed to perform conventional link training.

Step 508: Complete link training.

After equalization convergence, that is, after the equalization parameter converges to a fixed value, it indicates that the link training is completed, and a training result of the link training is obtained. In this case, the first device updates, based on the training result of the link training, the equalization parameter retrieval table stored in the first device. The second device also updates, based on the training result of the link training, the equalization parameter retrieval table stored in the second device. In other words, both the first device and the second device perform step 509.

Step 509: Update the equalization parameter retrieval table.

It should be noted that for a specific process of the link training method described in this embodiment of the present disclosure, refer to the related description in the foregoing embodiment shown in FIG. 3 or FIG. 4. Details are not described herein again.

In the link training method described in FIG. 5, the first device stores the device information of the first device, the second device stores the device information of the second device, the first device and the second device are connected through the cable, and the cable stores the cable information of the cable; during link training, the first device obtains the device information of the first device that is stored in the first device, obtains the cable information from the cable, and obtains the device information of the second device from the second device; the second device obtains the device information of the second device that is stored in the second device, obtains the cable information from the cable, and obtains the device information of the first device from the first device; and after obtaining the device information of the first device, the cable information, and the device information of the second device, both the first device and the second device may perform link training between the first device and the second device based on the device information of the first device, the cable information, and the device information of the second device. For example, both the first device and the second device may determine, based on the device information of the first device, the cable information, and the device information of the second device, a maximum working rate supported by the communication system, and perform fast link training between the first device and the second device at the maximum working rate. It can be learned that because the first device stores the device information of the first device, the second device stores the device information of the second device, and the cable stores the cable information of the cable, after any one or more link components of the first device, the second device, and the cable are replaced, and when the link training is performed again, the first device and the second device can further quickly obtain the device information of the first device, the cable information, and the device information of the second device. Therefore, the communication system can still implement fast link training without initialization.

Figure 7:
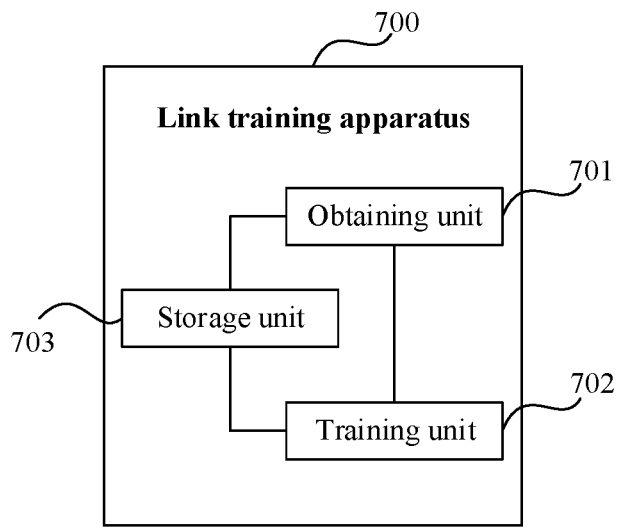
FIG. 7 is a schematic diagram of a structure of a link training apparatus according to an embodiment of the present disclosure.

FIG. 7 is a schematic diagram of a structure of a link training apparatus according to an embodiment of the present disclosure. The link training apparatus 700 may include an obtaining unit 701 and a training unit 702. The link training apparatus 700 is used in a communication system. The communication system includes a first device, a second device, and a cable that connects the first device and the second device. The cable stores cable information of the cable, and the cable information represents a cable capability. The link training apparatus 700 may be specifically used in the first device and/or the second device in the communication system, and the communication system may be the communication system shown in FIG. 3. The units are described in detail as follows.

The obtaining unit 701 is configured to obtain device information of the first device, obtain the cable information from the cable, and obtain device information of the second device, where the device information represents a device capability.

The training unit 702 is configured to perform link training between the first device and the second device based on the device information of the first device, the cable information, and the device information of the second device.

In a possible implementation, the cable information includes a rate supported by the cable, the device information of the first device includes a rate supported by the first device, and the device information of the second device includes a rate supported by the second device; and the training unit 702 is specifically configured to: determine a target training rate based on the device information of the first device, the cable information, and the device information of the second device; and perform first link training between the first device and the second device based on the target training rate.

In a possible implementation, the training unit 702 is further configured to: detect, if any one of the device information of the first device, the cable information, or the device information of the second device is not obtained, whether a link component is removed or powered off after previous link training succeeds, where the link component includes the first device, the second device, or the cable; determine the target training rate based on a training result of the previous link training if the link component is not removed or powered off after the previous link training succeeds; and perform second link training between the first device and the second device if the link component is removed or powered off after the previous link training succeeds, where a training rate of the second link training is a preset rate.

In a possible implementation, the training unit 702 is specifically configured to: search an equalization parameter retrieval table based on the target training rate, to obtain a first sending equalization parameter value and a first receiving equalization parameter value, where the equalization parameter retrieval table records a training result of link training; and perform training interaction between the first device and the second device based on the first sending equalization parameter value and the first receiving equalization parameter value, to obtain a training result of the first link training.

In a possible implementation, the training result of the link training includes: a cable identification code of the cable; a rate supported by the communication system, a lane corresponding to each rate, a first equalization parameter value corresponding to each lane, and a reserved parameter when the first device is a transmit end and the second device is a receive end; and a rate supported by the communication system, a quantity of lanes corresponding to each rate, a first equalization parameter value corresponding to each lane, and a reserved parameter when the first device is the receive end and the second device is the transmit end, where the first equalization parameter value is obtained through the link training, and the first equalization parameter value includes the first sending equalization parameter value and the first receiving equalization parameter value.

In a possible implementation, the training unit 702 is further configured to: search an equalization parameter prediction table based on the target training rate if the first sending equalization parameter value and the first receiving equalization parameter value are not found in the equalization parameter retrieval table, to obtain a second sending equalization parameter value and a second receiving equalization parameter value, where the equalization parameter prediction table records a prediction result of link training; and perform training interaction between the first device and the second device based on the second sending equalization parameter value and the second receiving equalization parameter value, to obtain the training result of the first link training.

In a possible implementation, the training unit 702 is further configured to: obtain the prediction result of the link training through prediction based on the device information of the first device, the cable information, and the device information of the second device, and record the prediction result of the link training in the equalization parameter prediction table.

In a possible implementation, the prediction result of the link training includes: a cable identification code of the cable; a rate supported by the communication system, a lane corresponding to each rate, a second equalization parameter value corresponding to each lane, and a reserved parameter when the first device is the transmit end and the second device is the receive end; and a rate supported by the communication system, a quantity of lanes corresponding to each rate, a second equalization parameter value corresponding to each lane, and a reserved parameter when the first device is the receive end and the second device is the transmit end, where the second equalization parameter value is obtained through prediction based on the device information of the first device, the cable information, and the device information of the second device, and the second equalization parameter value includes the second sending equalization parameter value and the second receiving equalization parameter value.

In a possible implementation, if the electronic apparatus is a transmit end, the training interaction includes: configuring a target sending equalization parameter value, and sending a preset code type to a receive end, where the receive end configures a target receiving equalization parameter value; and receiving the training result of the first link training from the receive end; or if the electronic apparatus is the receive end, the training interaction includes: configuring the target receiving equalization parameter value, and detecting whether the preset code type is received from the transmit end, where the transmit end configures the target sending equalization parameter value; roughly adjusting, if the preset code type is not received from the transmit end, the configured receiving equalization parameter value until the preset code type from the transmit end is detected; and finely adjusting, if the preset code type is received from the transmit end, the configured receiving equalization parameter value, to obtain the training result of the first link training, where if the transmit end is the first device, the receive end is the second device; and if the transmit end is the second device, the receive end is the first device; if the target sending equalization parameter value is the first sending equalization parameter value, the target receiving equalization parameter value is the first receiving equalization parameter value; and if the target sending equalization parameter value is the second sending equalization parameter value, the target receiving equalization parameter value is the second receiving equalization parameter value; and the preset code type is a code type used for training interaction.

In a possible implementation, if the first link training fails, the training unit 702 is further configured to: perform second link training between the first device and the second device at the preset rate.

In a possible implementation, after obtaining the training result of the first link training or obtaining a training result of the second link training, the training unit 702 is further configured to: update the equalization parameter retrieval table based on the training result of the first link training or the training result of the second link training.

It should be noted that for implementations of the units in this embodiment of the present disclosure, refer to the related descriptions in embodiments shown in FIG. 3 to FIG. 6. Details are not described herein again. Certainly, the link training apparatus 700 provided in this embodiment of the present disclosure includes, but not limited to, the foregoing units and modules. For example, the link training apparatus 700 may further include a storage unit 703. The storage unit 703 may be configured to store program code and data of the link training apparatus 700.

In the link training apparatus 700 described in FIG. 7, the first device stores the device information of the first device, the second device stores the device information of the second device, the first device and the second device are connected through the cable, and the cable stores the cable information of the cable; during link training, the first device obtains the device information of the first device that is stored in the first device, obtains the cable information from the cable, and obtains the device information of the second device from the second device; the second device obtains the device information of the second device that is stored in the second device, obtains the cable information from the cable, and obtains the device information of the first device from the first device; and after obtaining the device information of the first device, the cable information, and the device information of the second device, both the first device and the second device may perform link training between the first device and the second device based on the device information of the first device, the cable information, and the device information of the second device. For example, both the first device and the second device may determine, based on the device information of the first device, the cable information, and the device information of the second device, a maximum working rate supported by the communication system, and perform fast link training between the first device and the second device at the maximum working rate. It can be learned that because the first device stores the device information of the first device, the second device stores the device information of the second device, and the cable stores the cable information of the cable, after any one or more link components of the first device, the second device, and the cable are replaced, and when the link training is performed again, the first device and the second device can further quickly obtain the device information of the first device, the cable information, and the device information of the second device. Therefore, the communication system can still implement fast link training without initialization.

Figure 8:
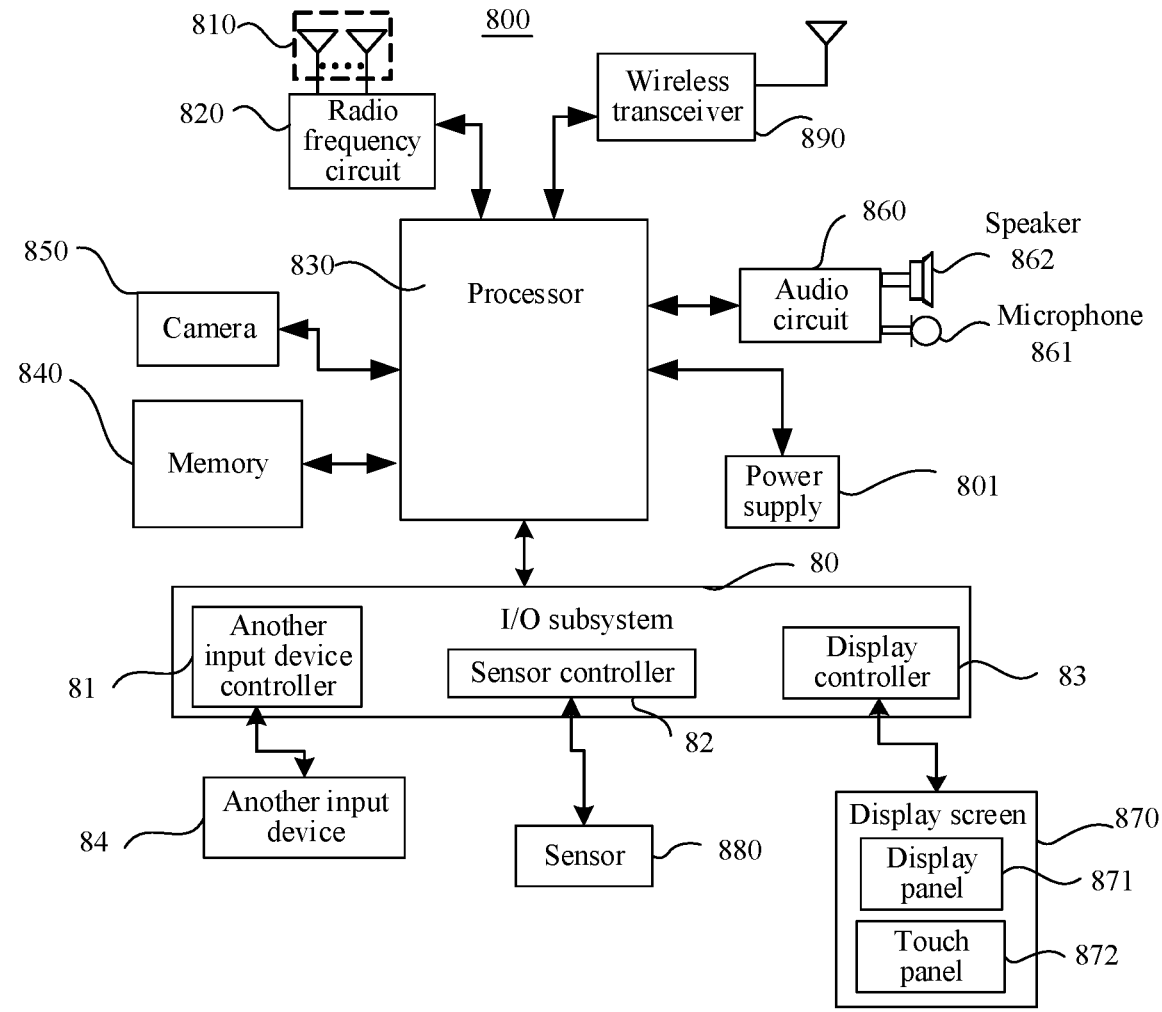
FIG. 8 is a schematic diagram of a structure of an electronic device according to an embodiment of the present disclosure.

FIG. 8 is a schematic diagram of a structure of an electronic device according to an embodiment of the present disclosure. It should be understood that the electronic device 800 may be the first device or the second device. The electronic device 800 may include an antenna system 810, a radio frequency (RF) circuit 820, a processor 830, a memory 840, a camera 850, an audio circuit 860, a display screen 870, one or more sensors 880, a wireless transceiver 890, and the like.

The antenna system 810 may be one or more antennas, or may be an antenna array including a plurality of antennas. The radio frequency circuit 820 may include one or more analog radio frequency transceivers, and the radio frequency circuit 820 may further include one or more digital radio frequency transceivers. The radio frequency circuit 820 is coupled to the antenna system 810. It should be noted that in embodiments of the present disclosure, coupling refers to an interrelationship in a particular manner, and includes direct connection or indirect connection by using another device such as various interfaces, transmission lines, or buses. The radio frequency circuit 820 may be configured for various types of cellular wireless communication.

The processor 830 may include a communication processor. The communication processor may be configured to control the radio frequency circuit 820 to receive and send a signal through the antenna system 810. The signal may be a voice signal, a media signal, or a control signal. The processor 830 may include various general-purpose processing devices, for example, may be a general-purpose central processing unit (CPU), a system on chip (SOC), a processor integrated on the SOC, an independent processor chip, or a controller. The processor 830 may further include a dedicated processing device, for example, an application-specific integrated circuit (ASIC), a field programmable gate array (FPGA), a digital signal processor (DSP), a dedicated video or graphics processor, a graphics processing unit (GPU), and a neural network processing unit (NPU). The processor 830 may be a processor group including a plurality of processors, and the plurality of processors are coupled to each other through one or more buses. The processor may include an analog-to-digital converter (ADC) and a digital-to-analog converter (DAC) to implement signal connection between different components of an apparatus.

The memory 840 is coupled to the processor 830. Specifically, the memory 840 may be coupled to the processor 830 by using one or more memory controllers. The memory 840 may be configured to store computer program instructions, including a computer operating system (OS), various user application programs, user data, and the like. The processor 830 may read the computer program instructions or the user data from the memory 840, or store the computer program instructions or the user data into the memory 840, to implement a related processing function. The memory 840 may be a power failure nonvolatile memory, for example, an Embedded Multi-Media Card (EMMC), a Universal Flash Storage (UFS), or a read-only memory (ROM), or may be another type of static storage device that may store static information or a static instruction, or may be a power failure volatile memory, for example, a random access memory (RAM), a static random-access memory (SRAM), or another type of dynamic storage device that may store information and an instruction, or may be an electrically erasable programmable read-only memory (EEPROM), a compact disc read-only memory (CD-ROM), or another compact disc storage, an optical disc storage (including a compact disc, a laser disc, a digital versatile disc, a Blu-ray disc, or the like), a magnetic disk storage medium or another magnetic storage device. This is not limited thereto. Optionally, the memory 840 may be independent of the processor 830, or the memory 840 may be integrated with the processor 830.

The camera 850 is configured to acquire an image or a video, and the audio circuit 860 is coupled to the processor 830. The audio circuit 860 may include a microphone 861 and a speaker 862. The microphone 861 may receive a sound input from the outside, and the speaker 862 may play audio data.

The display screen 870 is configured to provide various display interfaces or various menu information that can be selected for a user. For example, content displayed on the display screen 870 includes, but not limited to, a soft keyboard, a virtual mouse, a virtual key, an icon, and the like. The displayed content is associated with a specific internal module or function. The display screen 870 may further accept a user input. Specifically, the display screen 870 may include a display panel 871 and a touch panel 872.

The sensor 880 may include an image sensor, a motion sensor, a proximity sensor, an ambient noise sensor, a sound sensor, an accelerometer, a temperature sensor, a gyroscope, or another type of sensor, and a combination of various forms thereof. The processor 830 drives, by using a sensor controller 82 in an I/O subsystem 80, the sensor 880 to receive various information such as audio information, image information, or motion information, and the sensor 880 transmits the received information to the processor 830 for processing.

The wireless transceiver 890 may provide a wireless connection capability for another device. The another device may be a peripheral device such as a wireless headset, a Bluetooth headset, a wireless mouse, or a wireless keyboard, or may be a wireless network, for example, a Wireless Fidelity (Wi-Fi) network, a wireless personal area network (WPAN), or a WLAN thereof. The wireless transceiver 890 may be a Bluetooth-compatible transceiver, and is configured to wirelessly couple the processor 830 to the peripheral device such as the Bluetooth headset or the wireless mouse, or the wireless transceiver 890 may be a Wi-Fi-compatible transceiver, and is configured to wirelessly couple the processor 830 to the wireless network or another device.

The electronic device 800 may further include another input device 84 that is coupled to the processor 830 to receive various user inputs, for example, an input number, a name, an address, and a media selection. The another input device 84 may include a keyboard, a physical button (a press button, a rocker button, or the like), a dial pad, a slider switch, or the like. The electronic device 800 may further include the foregoing I/O subsystem 80 and a power supply 801. It should be understood that the electronic device 800 in FIG. 8 is merely an example, and constitutes no limitation on a specific form of the electronic device 800. The electronic device 800 may further include other existing or future components that are not shown in FIG. 8.

Figure 9:
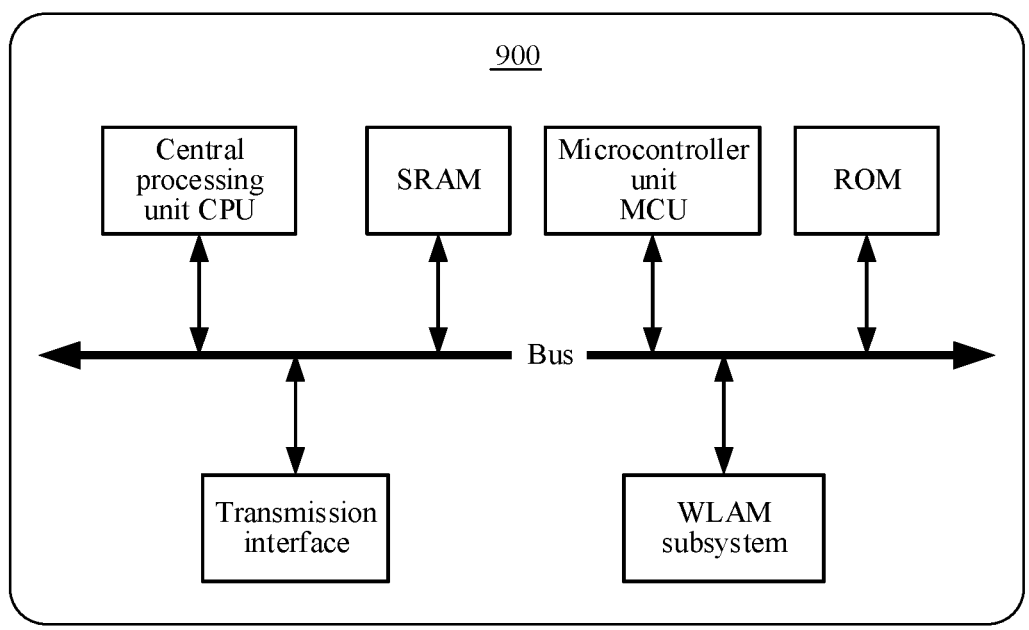
FIG. 9 is a schematic diagram of a structure of another electronic device according to an embodiment of the present disclosure.

FIG. 9 is a schematic diagram of a structure of another electronic device according to an embodiment of the present disclosure. The electronic device 900 includes: at least one CPU and a memory. A type of the memory may include, for example, an SRAM, a ROM, a microcontroller unit (MCU), a WLAN subsystem, a bus, and a transmission interface. Although not shown in FIG. 9, the electronic device 900 may further include other dedicated processors such as an application processor (AP) and an NPU, and other subsystems such as a power management subsystem, a clock management subsystem, and a power consumption management subsystem.

The foregoing parts of the electronic device 900 are coupled by using a connector. For example, the connector includes various types of interfaces, transmission lines, buses, and the like. These interfaces are usually electrical communication interfaces, but may also be mechanical interfaces or interfaces in other forms. This is not limited in this embodiment.

Optionally, the CPU may be a single-core (single-CPU) processor or a multi-core (multi-CPU) processor. Optionally, the CPU may be a processor group including a plurality of processors, and the plurality of processors are coupled to each other through one or more buses. In an optional case, the CPU implements any link training method in the foregoing method embodiments by invoking a program instruction stored in an on-chip memory or an off-chip memory. In an optional case, the CPU and the MCU jointly implement any link training method in the foregoing method embodiments. For example, the CPU completes some steps in the link training method, and the MCU completes other steps in the link training method. In an optional case, the AP or another dedicated processor implements any link training method in the foregoing method embodiments by invoking the program instruction stored in the on-chip memory or the off-chip memory.

The transmission interface may be a data receiving and sending interface of a processor chip. The transmission interface usually includes a plurality of interfaces. In an optional case, the transmission interface may include an I2C interface, a serial peripheral interface (SPI), a universal asynchronous receiver-transmitter (UART) interface, a general-purpose input/output (GPIO) interface, and the like. It should be understood that these interfaces may implement different functions by multiplexing a same physical interface.

In an optional case, the transmission interface may further include a HDMI, a V-By-One interface, an embedded display port (eDP), a Mobile Industry Processor Interface (MIPI), a Display Port (DP), or the like.

In an optional case, the foregoing parts are integrated on a same chip. In another optional case, the memory may be an independent chip.

For example, the WLAN subsystem may include a radio frequency circuit and a baseband.

The chip in embodiments of the present disclosure is a system manufactured on a same semiconductor substrate by using an integrated circuit process, and is also called a semiconductor chip. The chip may be a set of integrated circuits manufactured on the substrate (which is usually a semiconductor material such as silicon) by using the integrated circuit process, and an outer layer of the chip is usually encapsulated with a semiconductor encapsulation material. The integrated circuit may include various functional components. Each type of functional component includes a logic gate circuit, a metal oxide semiconductor (MOS) transistor, or a transistor such as a bipolar transistor or a diode, and may also include another part such as a capacitor, a resistor, or an inductor. Each functional component may independently operate or operate under action of necessary driver software, and may implement various functions such as communication, operation or storage.

An embodiment of the present disclosure further provides a link training apparatus, including: a processor and a transmission interface, where the processor is configured to invoke program instructions stored in a memory, to enable the link training apparatus to perform the method according to any one of the method embodiments.

An embodiment of the present disclosure further provides a computer-readable storage medium. The computer-readable storage medium stores a computer program. When the computer program runs on an electronic device, the method process shown in the foregoing method embodiments is implemented.

An embodiment of the present disclosure further provides a computer program. When the computer program runs on an electronic device, a computer, or a processor, the method process shown in the foregoing method embodiments is implemented.

In conclusion, it can be learned that in embodiments of the present disclosure, the communication system includes the first device, the cable, and the second device. When the system is not disconnected, and link training has been performed at a rate, and then the link training is performed at the rate, a sending equalization parameter value and a receiving equalization parameter value in a system state corresponding to the rate are directly read and configured, to implement fast link training in a specific scenario. A maximum working rate of the system is obtained based on the cable information of the cable, the device information of the first device, and the device information of the second device, to implement fast link training at a highest rate. The cable information of the cable, the device information of the first device, and the device information of the second device are confirmed, to implement fast link training when the cable, the first device, or the second device is replaced in a complex scenario. Receiving equalization fine adjustment is performed to some extent based on the cable information, the device information of the first device, and the device information of the second device, to implement high-precision fast link training. The cable information, the device information of the first device, and the device information of the second device are analyzed to predict an equalization parameter of the system. In embodiments of the present disclosure, link training time can be greatly reduced when a link limit is met. An FFE adjustment level can be increased to enhance link compatibility and scenario adaptability. A requirement of replacing the cable, the first device, or the second device in the complex scenario can be met. Physical link establishment time can be effectively shortened and a good effect is achieved in application scenarios such as fast system startup and rapid TV power on. Receiving equalization fine adjustment is performed to some extent based on the cable information, the device information of the first device, and the device information of the second device, so that high-precision fast link training can be met.

It should be understood that, the processor in embodiments of the present disclosure may be a CPU. The processor may be further another general-purpose processor, a DSP, an ASIC, a FPGA, or another programmable logic device, discrete gate or transistor logic device, discrete hardware component, or the like. A general purpose processor may be a microprocessor, or the processor may also be any conventional processor, or the like.

It should further be understood that the memory in embodiments of the present disclosure may be a volatile memory or a non-volatile memory, or may include a volatile memory and a non-volatile memory. The nonvolatile memory may be a ROM, a programmable read-only memory (PROM), an EPROM, an EEPROM, or a flash memory. The volatile memory may be a RAM, and is used as an external cache. It is described as an example but not a limitation, a plurality of forms of RAMs, for example, a SRAM, a dynamic RAM (DRAM), a synchronous DRAM (SDRAM), a double data rate SDRAM (DDR SDRAM), an enhanced SDRAM (ESDRAM), a Synchlink DRAM (SLDRAM), and a direct Rambus RAM (DR RAM), may be used.

It should be noted that, when the processor is a general-purpose processor, a DSP, an ASIC, an FPGA, or another programmable logic device, a discrete gate or a transistor logic device, or a discrete hardware component, the memory (a storage module) is integrated into the processor.

It should be noted that, the memory described in this specification intends to include, but not limited to, these memories and any other memory of an appropriate type.

It should be understood that, in various embodiments of the present disclosure, sequence numbers of the foregoing processes do not indicate an execution sequence. The execution sequence of the processes should be determined according to functions and internal logic of the processes, and should not be construed as any limitation on the implementation processes of embodiments of the present disclosure.

A person of ordinary skill in the art may be aware that, in combination with the examples described in embodiments disclosed in this specification, units and algorithm steps may be implemented by using electronic hardware or a combination of computer software and the electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in the present disclosure, it should be understood that the disclosed system, apparatus, and method may be implemented in other manners. For example, the described apparatus embodiment is merely exemplary. For example, the foregoing unit division is merely logical function division and there may be other division manners during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of embodiments.

In addition, functional units in embodiments of the present disclosure may be integrated into one processing unit, each of the units may exist independently physically, or two or more units may be integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the conventional technology, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in embodiments of the present disclosure. The foregoing storage medium includes: any medium that can store program code, such as a USB flash drive, a removable hard disk, a ROM, a RAM, a magnetic disk, or an optical disc.

Steps in the method of embodiments of the present disclosure may be adjusted in terms of a sequence, combined, or deleted according to an actual requirement. In addition, for terms and descriptions in embodiments of the present disclosure, refer to corresponding descriptions in other embodiments.

Merging, division, and removing may be performed on the modules in the apparatus in embodiments of the present disclosure according to an actual need.

The foregoing is merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof. In addition, the modifications and replacements do not make the essence of the corresponding technical solutions depart from the scope of the technical solutions of embodiments of the present disclosure.

What is claimed is:

1. A method, implemented by a first device in a communication system, the method comprising:
   obtaining first device information of the first device, wherein the first device information represents a first device capability of the first device;
   obtaining the cable information from a cable connecting the first device to a second device; and
   obtaining second device information of the second device, wherein the second device information represents a second device capability of the second device; and
   performing link training between the first device and the second device based on the first device information, the cable information, and the device information.

2. The method of claim 1, wherein the cable information comprises a first rate supported by the cable, the first device information comprises a second rate supported by the first device, and the second device information comprises a third rate supported by the second device, and wherein performing the link training between the first device and the second device based on the first device information, the cable information, and the second device information comprises:
   determining a target training rate based on the first device information, the cable information, and the device information; and
   performing first link training between the first device and the second device based on the target training rate.

3. The method of claim 2, further comprising:
   detecting whether a link component is removed or powered off after previous link training succeeds, wherein the link component comprises the first device, the second device, or the cable;
   determining the target training rate based on a training result of the previous link training if the link component is not removed or powered off after the previous link training succeeds; and
   performing second link training between the first device and the second device if the link component is removed or powered off after the previous link training succeeds, wherein a training rate of the second link training is a preset rate.

4. The method of claim 2, wherein the performing the first link training between the first device and the second device based on the target training rate comprises:
   obtaining a first sending equalization parameter value and a first receiving equalization parameter value from an equalization parameter retrieval table based on the target training rate when the first sending equalization parameter value and a first receiving equalization parameter value are found in the equalization parameter retrieval table, wherein the equalization parameter retrieval table records a second training result of the link training; and
   performing training interaction between the first device and the second device based on the first sending equalization parameter value and the first receiving equalization parameter value to obtain a third training result of the first link training.

5. The method of claim 4, wherein performing the first link training between the first device and the second device based on the target training rate further comprises:
   obtaining a second sending equalization parameter value and a second receiving equalization parameter value from an equalization parameter prediction table based on the target training rate when the first sending equalization parameter value and the first receiving equalization parameter value are not found in the equalization parameter retrieval table, wherein the equalization parameter prediction table records a prediction result of the link training; and
   performing training interaction between the first device and the second device based on the second sending equalization parameter value and the second receiving equalization parameter value to obtain the third training result.

6. The method of claim 5, wherein when the first device is a transmit end, the training interaction comprises:
   configuring a target sending equalization parameter value;
   sending a preset code type to a receive end; and
   receiving the third training result from the receive end.

7. The method of claim 3, wherein when the first link training fails, the method further comprises performing second link training between the first device and the second device at the preset rate.

8. The method of claim 4, wherein after obtaining the third training result or obtaining a fourth training result of a second link training, the method further comprises updating the equalization parameter retrieval table based on the third training result or the fourth training result of the second link training.

9. A first device comprising:
   a memory configured to store instructions; and
   one or more processors coupled to the memory and configured to execute the instructions to cause the first device to:
      obtain first device information of the first device, wherein the first device information represents a first device capability of the first device;
      obtain cable information from a cable connecting the first device to a second device,
      obtain second device information of the second device, wherein the second device information represents a second device capability of the second device; and perform link training between the first device and the second device based on the first device information, the cable information, and the second device information.

10. The first device of claim 9, wherein the cable information comprises a first rate supported by the cable, the first device information comprises a second rate supported by the first device, and the second device information comprises a third rate supported by the second device; and the one or more processors are configured to execute the instructions to further cause the first device to:
determine a target training rate based on the first device information, the cable information, and the second device information; and
perform first link training between the first device and the second device based on the target training rate.

11. The first device of claim 10, wherein the one or more processors are configured to execute the instructions to further cause the first device to:
detect whether a link component is removed or powered off after previous link training succeeds, wherein the link component comprises the first device, the second device, or the cable;
determine the target training rate based on a first training result of the previous link training if the link component is not removed or powered off after the previous link training succeeds; and
perform second link training between the first device and the second device if the link component is removed or powered off after the previous link training succeeds, wherein a training rate of the second link training is a preset rate.

12. The first device of claim 10, wherein the one or more processors are configured to execute the instructions to further cause the first device to:
obtain a first sending equalization parameter value and a first receiving equalization parameter value from an equalization parameter retrieval table based on the target training rate when the first sending equalization parameter value and a first receiving equalization parameter value are found in the equalization parameter retrieval table, wherein the equalization parameter retrieval table records a second training result of the link training; and
perform training interaction between the first device and the second device based on the first sending equalization parameter value and the first receiving equalization parameter value, to obtain a third training result of the first link training.

13. The first device of claim 12, wherein the one or more processors are configured to execute the instructions to further cause the first device training to:
obtain a second sending equalization parameter value and a second receiving equalization parameter value from an equalization parameter prediction table based on the target training rate when the first sending equalization parameter value and the first receiving equalization parameter value are not found in the equalization parameter retrieval table, wherein the equalization parameter prediction table records a prediction result of the link training; and
perform training interaction between the first device and the second device based on the second sending equalization parameter value and the second receiving equalization parameter value; to obtain the third training result.

14. The first device of claim 13, wherein when the first device is a transmit end, the training interaction comprises:
configuring a target sending equalization parameter value, and sending a preset code type to a receive end; and
receiving the third training result from the receive end.

15. The first device of claim 11, wherein when the first link training fails, the one or more processors are configured to execute the instructions to further cause the first device to perform second link training between the first device and the second device at the preset rate.

16. The method of claim 4, wherein when the first device is a receive end, the training interaction comprises:
configuring a target receiving equalization parameter value;
receiving a preset code type from a transmit end, wherein the training interaction is based on the preset code type; and
obtaining the third training result based on the target receiving equalization parameter value.

17. The method of claim 6, wherein when the target sending equalization parameter value is the first sending equalization parameter value, the target receiving equalization parameter value is the first receiving equalization parameter value; and when the target sending equalization parameter value is the second sending equalization parameter value, the target receiving equalization parameter value is the second receiving equalization parameter value.

18. The first device of claim 14, wherein when the first device is a receive end, the training interaction comprises:
configuring a target receiving equalization parameter value;
receiving a preset code type from a transmit end, wherein the training interaction is based on the preset code type; and
obtaining the third training result based on the target receiving equalization parameter value.

19. The first device of claim 14, wherein when the target sending equalization parameter value is the first sending equalization parameter value, the target receiving equalization parameter value is the first receiving equalization parameter value; and when the target sending equalization parameter value is the second sending equalization parameter value, the target receiving equalization parameter value is the second receiving equalization parameter value.

20. A computer program product comprising computer-executable instructions stored on a non-transitory computer-readable storage medium, the computer-executable instructions when executed by one or more processors of a first device, cause the first device to:
obtain first device information of the first device, wherein the first device information represents a first device capability of the first device;
obtain cable information from a cable connecting the first device to a second device;
obtain second device information of the second device, wherein the second device information represents a second device capability of the second device; and
perform link training between the first device and the second device based on the first device information, the cable information, and the second device information.

* * * * *

UNITED STATES PATENT AND TRADEMARK OFFICE
CERTIFICATE OF CORRECTION

PATENT NO. : 12,206,528 B2
APPLICATION NO. : 18/333760
DATED : January 21, 2025
INVENTOR(S) : Dongdong Shen et al.

Page 1 of 1

It is certified that error appears in the above-identified patent and that said Letters Patent is hereby corrected as shown below:

In the Claims

Claim 1, Column 55, Line 37: "device; and" should read "device;"

Claim 3, Column 55, Line 62: "based on a training" should read "based on a first training"

Claim 9, Column 56, Line 64: "second device," should read "second device;"

Claim 13, Column 58, Line 2: "parameter value; to obtain" should read "parameter value to obtain"

Signed and Sealed this
Sixteenth Day of September, 2025

Coke Morgan Stewart
*Acting Director of the United States Patent and Trademark Office*